(12) United States Patent
Roosenraad et al.

(10) Patent No.: US 11,606,380 B2
(45) Date of Patent: Mar. 14, 2023

(54) APPARATUS AND METHODS FOR DATA COLLECTION, ANALYSIS AND SERVICE MODIFICATION BASED ON ONLINE ACTIVITY

(71) Applicant: Time Warner Cable Enterprises LLC, St. Louis, MO (US)

(72) Inventors: Chris Roosenraad, Vienna, VA (US); Richard Harman, Austin, TX (US); John W. Watson, Falls Church, VA (US); Christopher Turner, Leesburg, VA (US); Philip Arnhold, Herndon, VA (US); Brian Durham, Manassas, VA (US); Barbara Stovall, Webster Groves, MO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 17/366,528

(22) Filed: Jul. 2, 2021

(65) Prior Publication Data

US 2021/0377290 A1    Dec. 2, 2021

Related U.S. Application Data

(60) Continuation of application No. 16/173,996, filed on Oct. 29, 2018, now Pat. No. 11,057,408, which is a (Continued)

(51) Int. Cl.
G06F 21/31    (2013.01)
H04W 12/00    (2021.01)
(Continued)

(52) U.S. Cl.
CPC ...... *H04L 63/1425* (2013.01); *G06F 16/9535* (2019.01); *H04L 43/04* (2013.01);
(Continued)

(58) Field of Classification Search
CPC ......... H04W 12/00; H04L 63/14; G06F 21/31
(Continued)

(56) References Cited

U.S. PATENT DOCUMENTS 4,677,501 A    6/1987    Saltzman et al.
5,253,066 A    10/1993   Vogel et al.
(Continued)

FOREIGN PATENT DOCUMENTS

EP    1087619 A1    3/2001
EP    1821459 A1    8/2007
(Continued)

OTHER PUBLICATIONS

US 6,940,674 B2, 09/2005, Sugiyama (withdrawn)
(Continued)

*Primary Examiner* — Izunna Okeke
(74) *Attorney, Agent, or Firm* — Patent Beach PC

(57) ABSTRACT

Methods and apparatus for evaluating collected data relating to online activity, and modification of services within a service provider network. In one embodiment, a service provider collects data relating to the online activity of users of third-party services and correlates the data with subscribers of the service provider to generate useful products and analytics (e.g., classifications, behavioral models, etc.) containing information relating to the subscribers' online activity. The generated products may be used to determine whether and how to modify services provided to individual subscribers, exported for use by third parties, or for other purposes.

20 Claims, 14 Drawing Sheets

Related U.S. Application Data division of application No. 15/045,043, filed on Feb. 16, 2016, now Pat. No. 10,116,676.

(60) Provisional application No. 62/116,212, filed on Feb. 13, 2015.

(51) Int. Cl.
  H04L 9/40 (2022.01)
  H04L 43/04 (2022.01)
  G06F 16/9535 (2019.01)
  H04L 67/53 (2022.01)
  H04L 67/50 (2022.01)

(52) U.S. Cl.
  CPC .......... *H04L 63/1466* (2013.01); *H04L 67/53* (2022.05); *H04L 67/535* (2022.05)

(58) Field of Classification Search
  USPC .................. 726/2, 7, 13, 22, 26; 713/188
  See application file for complete search history.

(56) References Cited

U.S. PATENT DOCUMENTS

| | | |
|---|---|---|
| 5,285,272 A | 2/1994 | Bradley et al. |
| 5,335,277 A | 8/1994 | Harvey et al. |
| 5,357,276 A | 10/1994 | Banker et al. |
| 5,371,551 A | 12/1994 | Logan et al. |
| 5,410,344 A | 4/1995 | Graves et al. |
| 5,436,917 A | 7/1995 | Karasawa |
| 5,469,541 A | 11/1995 | Kingman et al. |
| 5,477,263 A | 12/1995 | O'Callaghan et al. |
| 5,517,257 A | 5/1996 | Dunn et al. |
| 5,528,282 A | 6/1996 | Voeten et al. |
| 5,528,284 A | 6/1996 | Iwami et al. |
| 5,534,911 A | 7/1996 | Levitan |
| 5,543,927 A | 8/1996 | Herz |
| 5,550,640 A | 8/1996 | Tsuboi et al. |
| 5,557,319 A | 9/1996 | Gurusami et al. |
| 5,579,183 A | 11/1996 | Van et al. |
| 5,606,726 A | 2/1997 | Yoshinobu |
| 5,619,247 A | 4/1997 | Russo |
| 5,628,284 A | 5/1997 | Sheen et al. |
| 5,671,386 A | 9/1997 | Blair et al. |
| 5,682,597 A | 10/1997 | Ganek et al. |
| 5,687,275 A | 11/1997 | Lane et al. |
| 5,699,360 A | 12/1997 | Nishida et al. |
| 5,708,961 A | 1/1998 | Hylton et al. |
| 5,710,970 A | 1/1998 | Walters et al. |
| 5,721,878 A | 2/1998 | Ottesen et al. |
| 5,727,113 A | 3/1998 | Shimoda |
| 5,729,280 A | 3/1998 | Inoue et al. |
| 5,729,648 A | 3/1998 | Boyce et al. |
| 5,745,837 A | 4/1998 | Fuhrmann |
| 5,748,254 A | 5/1998 | Harrison et al. |
| 5,758,257 A | 5/1998 | Herz et al. |
| 5,778,187 A | 7/1998 | Monteiro et al. |
| 5,790,935 A | 8/1998 | Payton |
| 5,793,971 A | 8/1998 | Fujita et al. |
| 5,794,217 A | 8/1998 | Allen |
| 5,798,785 A | 8/1998 | Hendricks et al. |
| 5,808,608 A | 9/1998 | Young et al. |
| 5,818,438 A | 10/1998 | Howe et al. |
| 5,818,510 A | 10/1998 | Cobbley et al. |
| 5,822,493 A | 10/1998 | Uehara et al. |
| 5,822,530 A | 10/1998 | Brown |
| 5,828,420 A | 10/1998 | Marshall et al. |
| 5,838,921 A | 11/1998 | Speeter |
| 5,844,552 A | 12/1998 | Gaughan et al. |
| 5,850,218 A | 12/1998 | Lajoie et al. |
| 5,861,881 A | 1/1999 | Freeman et al. |
| 5,887,243 A | 3/1999 | Harvey et al. |
| 5,897,635 A | 4/1999 | Torres et al. |
| 5,915,068 A | 6/1999 | Levine |
| 5,917,538 A | 6/1999 | Asamizuya |
| 5,940,738 A | 8/1999 | Rao |
| 5,999,525 A | 12/1999 | Krishnaswamy et al. |
| 5,999,535 A | 12/1999 | Wang et al. |
| 6,005,603 A | 12/1999 | Flavin |
| 6,016,316 A | 1/2000 | Moura et al. |
| 6,026,211 A | 2/2000 | Nakamura et al. |
| 6,046,760 A | 4/2000 | Jun |
| 6,047,327 A | 4/2000 | Tso et al. |
| 6,052,588 A | 4/2000 | Mo et al. |
| 6,055,358 A | 4/2000 | Traxlmayr |
| 6,065,050 A | 5/2000 | Demoney |
| 6,108,002 A | 8/2000 | Ishizaki |
| 6,115,532 A | 9/2000 | Saeki |
| 6,118,472 A | 9/2000 | Dureau et al. |
| 6,118,922 A | 9/2000 | Van et al. |
| 6,125,397 A | 9/2000 | Yoshimura et al. |
| 6,154,766 A | 11/2000 | Yost et al. |
| 6,167,432 A | 12/2000 | Jiang |
| 6,172,712 B1 | 1/2001 | Beard |
| 6,177,931 B1 | 1/2001 | Alexander et al. |
| 6,181,697 B1 | 1/2001 | Nurenberg et al. |
| 6,212,562 B1 | 4/2001 | Huang |
| 6,219,710 B1 | 4/2001 | Gray et al. |
| 6,233,389 B1 | 5/2001 | Barton et al. |
| 6,253,375 B1 | 6/2001 | Gordon et al. |
| 6,259,701 B1 | 7/2001 | Shur et al. |
| 6,286,049 B1 | 9/2001 | Rajakarunanayake et al. |
| 6,314,572 B1 | 11/2001 | Larocca et al. |
| 6,317,884 B1 | 11/2001 | Eames et al. |
| 6,324,338 B1 | 11/2001 | Wood et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,442,328 B1 | 8/2002 | Elliott et al. |
| 6,442,332 B1 | 8/2002 | Knudson et al. |
| 6,473,793 B1 | 10/2002 | Dillon et al. |
| 6,519,062 B1 | 2/2003 | Yoo |
| 6,523,696 B1 | 2/2003 | Saito et al. |
| 6,532,593 B1 | 3/2003 | Moroney |
| 6,543,053 B1 | 4/2003 | Li et al. |
| 6,546,016 B1 | 4/2003 | Gerszberg et al. |
| 6,564,381 B1 | 5/2003 | Hodge et al. |
| 6,581,207 B1 | 6/2003 | Sumita et al. |
| 6,609,253 B1 | 8/2003 | Swix et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,721,789 B1 | 4/2004 | Demoney |
| 6,748,395 B1 | 6/2004 | Picker et al. |
| 6,754,904 B1 | 6/2004 | Cooper et al. |
| 6,757,906 B1 | 6/2004 | Look et al. |
| 6,769,127 B1 | 7/2004 | Bonomi et al. |
| 6,774,926 B1 | 8/2004 | Ellis et al. |
| 6,788,676 B2 | 9/2004 | Partanen et al. |
| 6,847,778 B1 | 1/2005 | Vallone et al. |
| 6,865,746 B1 | 3/2005 | Herrington et al. |
| 6,909,726 B1 | 6/2005 | Sheeran |
| 6,917,614 B1 | 7/2005 | Laubach et al. |
| 6,917,641 B2 | 7/2005 | Kotzin et al. |
| 6,918,131 B1 | 7/2005 | Rautila et al. |
| 6,925,257 B2 | 8/2005 | Yoo |
| 6,931,018 B1 | 8/2005 | Fisher |
| 6,931,657 B1 | 8/2005 | Marsh |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 6,981,045 B1 | 12/2005 | Brooks |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |

(56) References Cited

U.S. PATENT DOCUMENTS

| | | |
|---|---|---|
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,073,189 B2 | 7/2006 | McElhatten et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,197,708 B1 | 3/2007 | Frendo et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,228,556 B2 | 6/2007 | Beach et al. |
| 7,228,656 B2 | 6/2007 | Mitchell et al. |
| 7,240,359 B1 | 7/2007 | Sie et al. |
| 7,242,960 B2 | 7/2007 | Van et al. |
| 7,242,988 B1 | 7/2007 | Hoffberg et al. |
| 7,254,608 B2 | 8/2007 | Yeager et al. |
| 7,257,106 B2 | 8/2007 | Chen et al. |
| 7,260,823 B2 | 8/2007 | Schlack et al. |
| 7,265,927 B2 | 9/2007 | Sugiyama et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 1/2008 | Shao et al. |
| 7,330,483 B1 | 2/2008 | Peters, Jr. et al. |
| 7,330,510 B2 | 2/2008 | Castillo et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,759 B1 | 3/2008 | Rodriguez |
| 7,340,762 B2 | 3/2008 | Kim |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,382,786 B2 | 6/2008 | Chen et al. |
| 7,406,515 B1 | 7/2008 | Joyce et al. |
| 7,421,725 B2 | 9/2008 | Hane et al. |
| 7,444,655 B2 | 10/2008 | Sardera |
| 7,457,520 B2 | 11/2008 | Rosetti et al. |
| 7,486,869 B2 | 2/2009 | Alexander et al. |
| 7,487,523 B1 | 2/2009 | Hendricks |
| 7,532,712 B2 | 5/2009 | Gonder et al. |
| 7,543,322 B1 | 6/2009 | Bhogal et al. |
| 7,548,562 B2 | 6/2009 | Ward et al. |
| 7,567,983 B2 | 7/2009 | Pickelsimer et al. |
| 7,571,452 B2 | 8/2009 | Gutta |
| 7,592,912 B2 | 9/2009 | Hasek et al. |
| 7,602,820 B2 | 10/2009 | Helms et al. |
| 7,609,637 B2 | 10/2009 | Doshi et al. |
| 7,624,337 B2 | 11/2009 | Sull et al. |
| 7,650,319 B2 | 1/2010 | Hoffberg et al. |
| 7,657,907 B2 | 2/2010 | Fennan et al. |
| 7,690,020 B2 | 3/2010 | Lebar |
| 7,693,171 B2 | 4/2010 | Gould |
| 7,721,310 B2 | 5/2010 | Schaffer et al. |
| 7,721,314 B2 | 5/2010 | Sincaglia et al. |
| 7,725,553 B2 | 5/2010 | Rang et al. |
| 7,742,074 B2 | 6/2010 | Minatogawa |
| 7,763,360 B2 | 7/2010 | Paul et al. |
| 7,770,200 B2 | 8/2010 | Brooks et al. |
| 7,787,539 B2 | 8/2010 | Chen |
| 7,809,942 B2 | 10/2010 | Baran et al. |
| 7,889,765 B2 | 2/2011 | Brooks et al. |
| 7,893,171 B2 | 2/2011 | Le et al. |
| 7,900,052 B2 | 3/2011 | Jonas et al. |
| 7,908,626 B2 | 3/2011 | Williamson et al. |
| 7,916,755 B2 | 3/2011 | Hasek et al. |
| 7,924,451 B2 | 4/2011 | Hirooka |
| 7,936,775 B2 | 5/2011 | Iwamura |
| 7,937,725 B1 | 5/2011 | Schaffer et al. |
| 7,954,131 B2 | 5/2011 | Cholas et al. |
| 7,975,283 B2 | 7/2011 | Bedingfield et al. |
| 7,987,491 B2 | 7/2011 | Reisman |
| 8,015,306 B2 | 9/2011 | Bowman |
| 8,024,762 B2 | 9/2011 | Britt |
| 8,032,914 B2 | 10/2011 | Rodriguez |
| 8,042,054 B2 | 10/2011 | White et al. |
| 8,046,836 B2 | 10/2011 | Isokawa |
| 8,056,103 B2 | 11/2011 | Candelore |
| 8,073,460 B1 | 12/2011 | Scofield et al. |
| 8,078,696 B2 | 12/2011 | Lajoie et al. |
| 8,087,050 B2 | 12/2011 | Ellis et al. |
| 8,090,014 B2 | 1/2012 | Cheung et al. |
| 8,090,104 B2 | 1/2012 | Wajs et al. |
| 8,095,610 B2 | 1/2012 | Gould et al. |
| 8,099,757 B2 | 1/2012 | Riedl et al. |
| 8,151,194 B1 | 4/2012 | Chan et al. |
| 8,151,294 B2 | 4/2012 | Carlucci et al. |
| 8,166,126 B2 | 4/2012 | Bristow et al. |
| 8,170,065 B2 | 5/2012 | Hasek et al. |
| 8,181,209 B2 | 5/2012 | Hasek et al. |
| 8,196,201 B2 * | 6/2012 | Repasi .................. G06F 21/552 |
| | | 726/25 |
| 8,214,256 B2 | 7/2012 | Riedl et al. |
| 8,219,134 B2 | 7/2012 | Maharajh et al. |
| 8,249,497 B2 | 8/2012 | Ingrassia et al. |
| 8,280,833 B2 * | 10/2012 | Miltonberger ....... G06Q 50/265 |
| | | 706/45 |
| 8,280,982 B2 | 10/2012 | La et al. |
| 8,281,352 B2 | 10/2012 | Brooks et al. |
| 8,290,811 B1 | 10/2012 | Robinson et al. |
| 8,341,242 B2 | 12/2012 | Dillon et al. |
| 8,347,341 B2 | 1/2013 | Markley et al. |
| 8,396,055 B2 | 3/2013 | Patel et al. |
| 8,429,702 B2 | 4/2013 | Yasrebi et al. |
| 8,472,371 B1 | 6/2013 | Bari et al. |
| 8,479,251 B2 | 7/2013 | Feinleib et al. |
| 8,484,511 B2 | 7/2013 | Engel et al. |
| 8,516,529 B2 | 8/2013 | Lajoie et al. |
| 8,520,850 B2 | 8/2013 | Helms et al. |
| 8,549,013 B1 | 10/2013 | Sarma et al. |
| 8,561,103 B2 | 10/2013 | Begeja et al. |
| 8,561,116 B2 | 10/2013 | Hasek |
| 8,615,573 B1 | 12/2013 | Walsh et al. |
| 8,677,431 B2 | 3/2014 | Smith |
| 8,713,623 B2 | 4/2014 | Brooks |
| 8,731,053 B2 | 5/2014 | Karegoudar |
| 8,738,607 B2 | 5/2014 | Dettinger et al. |
| 8,750,490 B2 | 6/2014 | Murtagh et al. |
| 8,750,909 B2 | 6/2014 | Fan et al. |
| 8,805,270 B2 | 8/2014 | Maharajh et al. |
| 8,813,122 B2 | 8/2014 | Montie et al. |
| 8,838,149 B2 | 9/2014 | Hasek |
| 8,949,919 B2 | 2/2015 | Cholas et al. |
| 8,995,815 B2 | 3/2015 | Maharajh et al. |
| 9,015,736 B2 | 4/2015 | Cordray et al. |
| 9,021,566 B2 | 4/2015 | Panayotopoulos et al. |
| 9,043,431 B2 | 5/2015 | Chappell et al. |
| 9,049,344 B2 | 6/2015 | Savoor et al. |
| 9,124,608 B2 | 9/2015 | Jin et al. |
| 9,124,650 B2 | 9/2015 | Maharajh et al. |
| 9,215,423 B2 | 12/2015 | Kimble et al. |
| 9,264,743 B1 | 2/2016 | Diep et al. |
| 9,317,195 B1 | 4/2016 | Grechishkin et al. |
| 9,467,723 B2 | 10/2016 | Osminer |
| 9,473,730 B2 | 10/2016 | Roy et al. |
| 9,832,425 B2 | 11/2017 | Barnes et al. |
| 9,858,396 B2 | 1/2018 | Nair et al. |
| 9,906,838 B2 | 2/2018 | Cronk et al. |
| 2001/0004768 A1 | 6/2001 | Hodge et al. |
| 2001/0043613 A1 | 11/2001 | Wibowo et al. |
| 2001/0047516 A1 | 11/2001 | Swain et al. |
| 2001/0050924 A1 | 12/2001 | Herrmann et al. |

(56) References Cited

U.S. PATENT DOCUMENTS

| | | |
|---|---|---|
| 2001/0050945 A1 | 12/2001 | Lindsey |
| 2002/0002688 A1 | 1/2002 | Gregg et al. |
| 2002/0024943 A1 | 2/2002 | Karaul et al. |
| 2002/0026645 A1 | 2/2002 | Son et al. |
| 2002/0027883 A1 | 3/2002 | Belaiche |
| 2002/0027894 A1 | 3/2002 | Arrakoski et al. |
| 2002/0031120 A1 | 3/2002 | Rakib |
| 2002/0032754 A1 | 3/2002 | Logston et al. |
| 2002/0042914 A1 | 4/2002 | Walker et al. |
| 2002/0042921 A1 | 4/2002 | Ellis |
| 2002/0049755 A1 | 4/2002 | Koike |
| 2002/0053076 A1 | 5/2002 | Landesmann |
| 2002/0056087 A1 | 5/2002 | Berezowski et al. |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0075805 A1 | 6/2002 | Gupta et al. |
| 2002/0083451 A1 | 6/2002 | Gill et al. |
| 2002/0087995 A1 | 7/2002 | Pedlow et al. |
| 2002/0100059 A1 | 7/2002 | Buehl et al. |
| 2002/0104087 A1 | 8/2002 | Schaffer et al. |
| 2002/0123931 A1 | 9/2002 | Splaver et al. |
| 2002/0129368 A1 | 9/2002 | Schlack et al. |
| 2002/0131511 A1 | 9/2002 | Zenoni |
| 2002/0133815 A1 | 9/2002 | Mizutome et al. |
| 2002/0143607 A1 | 10/2002 | Connelly |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0152299 A1 | 10/2002 | Traversat et al. |
| 2002/0152474 A1 | 10/2002 | Dudkiewicz |
| 2002/0174430 A1 | 11/2002 | Ellis et al. |
| 2002/0174433 A1 | 11/2002 | Baumgartner et al. |
| 2002/0178444 A1 | 11/2002 | Trajkovic et al. |
| 2002/0188744 A1 | 12/2002 | Mani |
| 2002/0188869 A1 | 12/2002 | Patrick |
| 2002/0188947 A1 | 12/2002 | Wang et al. |
| 2002/0188949 A1 | 12/2002 | Wang et al. |
| 2002/0191950 A1 | 12/2002 | Wang |
| 2002/0194595 A1 | 12/2002 | Miller et al. |
| 2002/0199194 A1 | 12/2002 | Ali |
| 2003/0005453 A1 | 1/2003 | Rodriguez et al. |
| 2003/0005457 A1 | 1/2003 | Faibish et al. |
| 2003/0028451 A1 | 2/2003 | Ananian |
| 2003/0028873 A1 | 2/2003 | Lemmons |
| 2003/0046704 A1 | 3/2003 | Laksono et al. |
| 2003/0056217 A1 | 3/2003 | Brooks |
| 2003/0061618 A1 | 3/2003 | Horiuchi et al. |
| 2003/0066068 A1 | 4/2003 | Gutta et al. |
| 2003/0086422 A1 | 5/2003 | Klinker et al. |
| 2003/0093790 A1 | 5/2003 | Logan et al. |
| 2003/0093794 A1 | 5/2003 | Thomas et al. |
| 2003/0097574 A1 | 5/2003 | Upton |
| 2003/0115267 A1 | 6/2003 | Hinton et al. |
| 2003/0118014 A1 | 6/2003 | Iyer et al. |
| 2003/0120817 A1 | 6/2003 | Ott et al. |
| 2003/0121041 A1 | 6/2003 | Mineyama |
| 2003/0123465 A1 | 7/2003 | Donahue |
| 2003/0135628 A1 | 7/2003 | Fletcher et al. |
| 2003/0135860 A1 | 7/2003 | Dureau |
| 2003/0163443 A1 | 8/2003 | Wang |
| 2003/0165241 A1 | 9/2003 | Fransdonk |
| 2003/0166401 A1 | 9/2003 | Combes et al. |
| 2003/0188317 A1 | 10/2003 | Liew et al. |
| 2003/0200548 A1 | 10/2003 | Baran et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2004/0003402 A1 | 1/2004 | McKenna, Jr. |
| 2004/0015986 A1 | 1/2004 | Carver et al. |
| 2004/0019913 A1 | 1/2004 | Wong et al. |
| 2004/0031058 A1 | 2/2004 | Reisman |
| 2004/0034677 A1 | 2/2004 | Davey et al. |
| 2004/0034877 A1 | 2/2004 | Nogues |
| 2004/0038689 A1 | 2/2004 | Holur |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0049694 A1 | 3/2004 | Candelore |
| 2004/0057457 A1 | 3/2004 | Ahn et al. |
| 2004/0073915 A1 | 4/2004 | Dureau |
| 2004/0073924 A1 | 4/2004 | Pendakur |
| 2004/0083177 A1 | 4/2004 | Chen et al. |
| 2004/0117254 A1 | 6/2004 | Nemirofsky et al. |
| 2004/0117838 A1 | 6/2004 | Karaoguz et al. |
| 2004/0117855 A1 | 6/2004 | Nakamura |
| 2004/0133923 A1 | 7/2004 | Watson et al. |
| 2004/0137918 A1 | 7/2004 | Varonen et al. |
| 2004/0158870 A1 | 8/2004 | Paxton et al. |
| 2004/0166832 A1 | 8/2004 | Portman et al. |
| 2004/0216158 A1 | 10/2004 | Blas |
| 2004/0230994 A1 | 11/2004 | Urdang et al. |
| 2004/0250273 A1 | 12/2004 | Swix et al. |
| 2004/0268398 A1 | 12/2004 | Fano et al. |
| 2004/0268403 A1 | 12/2004 | Krieger et al. |
| 2005/0002418 A1 | 1/2005 | Yang et al. |
| 2005/0002638 A1 | 1/2005 | Putterman et al. |
| 2005/0005308 A1 | 1/2005 | Logan et al. |
| 2005/0028208 A1 | 2/2005 | Ellis et al. |
| 2005/0034171 A1 | 2/2005 | Benya |
| 2005/0047501 A1 | 3/2005 | Yoshida et al. |
| 2005/0049886 A1 | 3/2005 | Grannan et al. |
| 2005/0050579 A1 | 3/2005 | Dietz et al. |
| 2005/0055220 A1 | 3/2005 | Lee et al. |
| 2005/0055729 A1 | 3/2005 | Atad et al. |
| 2005/0071882 A1 | 3/2005 | Rodriguez et al. |
| 2005/0076365 A1 | 4/2005 | Popov et al. |
| 2005/0083921 A1 | 4/2005 | McDermott et al. |
| 2005/0086334 A1 | 4/2005 | Aaltonen et al. |
| 2005/0086683 A1 | 4/2005 | Meyerson |
| 2005/0097599 A1 | 5/2005 | Plotnick et al. |
| 2005/0108763 A1 | 5/2005 | Baran et al. |
| 2005/0114701 A1 | 5/2005 | Atkins et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0223097 A1 | 10/2005 | Ramsayer et al. |
| 2005/0228725 A1 | 10/2005 | Rao et al. |
| 2005/0235307 A1 | 10/2005 | Relan et al. |
| 2005/0289616 A1 | 12/2005 | Horiuchi et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0021019 A1 | 1/2006 | Hinton et al. |
| 2006/0041905 A1 | 2/2006 | Wasilewski |
| 2006/0041915 A1 | 2/2006 | Dimitrova et al. |
| 2006/0047957 A1 | 3/2006 | Helms et al. |
| 2006/0053463 A1 | 3/2006 | Choi |
| 2006/0059342 A1 | 3/2006 | Medvinsky et al. |
| 2006/0059532 A1 | 3/2006 | Dugan et al. |
| 2006/0061682 A1 | 3/2006 | Bradley et al. |
| 2006/0085416 A1 | 4/2006 | Naoi et al. |
| 2006/0090186 A1 | 4/2006 | Santangelo et al. |
| 2006/0095940 A1 | 5/2006 | Yearwood |
| 2006/0117379 A1 | 6/2006 | Bennett et al. |
| 2006/0128397 A1 | 6/2006 | Choti et al. |
| 2006/0130099 A1 | 6/2006 | Rooyen |
| 2006/0130101 A1 | 6/2006 | Wessel |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0139379 A1 | 6/2006 | Toma et al. |
| 2006/0149850 A1 | 7/2006 | Bowman |
| 2006/0156392 A1 | 7/2006 | Baugher et al. |
| 2006/0161635 A1 | 7/2006 | Lamkin et al. |
| 2006/0165082 A1 | 7/2006 | Pfeffer et al. |
| 2006/0165173 A1 | 7/2006 | Kim et al. |
| 2006/0171423 A1 | 8/2006 | Helms et al. |
| 2006/0187900 A1 | 8/2006 | Akbar |

(56) References Cited

U.S. PATENT DOCUMENTS

| | | |
|---|---|---|
| 2006/0206712 A1 | 9/2006 | Dillaway et al. |
| 2006/0209799 A1 | 9/2006 | Gallagher et al. |
| 2006/0218601 A1 | 9/2006 | Michel |
| 2006/0218604 A1 | 9/2006 | Riedl et al. |
| 2006/0221246 A1 | 10/2006 | Yoo |
| 2006/0224690 A1 | 10/2006 | Falkenburg et al. |
| 2006/0236358 A1 | 10/2006 | Liu et al. |
| 2006/0238656 A1 | 10/2006 | Chen et al. |
| 2006/0248553 A1 | 11/2006 | Mikkelson et al. |
| 2006/0259927 A1 | 11/2006 | Acharya et al. |
| 2006/0288366 A1 | 12/2006 | Boylan et al. |
| 2006/0291506 A1 | 12/2006 | Cain |
| 2007/0014293 A1 | 1/2007 | Filsfils et al. |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0025372 A1 | 2/2007 | Brenes et al. |
| 2007/0033282 A1 | 2/2007 | Mao et al. |
| 2007/0033531 A1 | 2/2007 | Marsh |
| 2007/0038671 A1 | 2/2007 | Holm et al. |
| 2007/0049245 A1 | 3/2007 | Lipman |
| 2007/0050822 A1 | 3/2007 | Stevens et al. |
| 2007/0053513 A1 | 3/2007 | Hoffberg |
| 2007/0061023 A1 | 3/2007 | Hoffberg et al. |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0079333 A1 | 4/2007 | Murakami et al. |
| 2007/0081537 A1 | 4/2007 | Wheelock |
| 2007/0094691 A1 | 4/2007 | Gazdzinski |
| 2007/0113246 A1 | 5/2007 | Xiong |
| 2007/0118848 A1 | 5/2007 | Schwesinger et al. |
| 2007/0121578 A1 | 5/2007 | Annadata et al. |
| 2007/0121678 A1 | 5/2007 | Brooks et al. |
| 2007/0124488 A1 | 5/2007 | Baum et al. |
| 2007/0127519 A1 | 6/2007 | Hasek et al. |
| 2007/0136777 A1 | 6/2007 | Hasek et al. |
| 2007/0153820 A1 | 7/2007 | Gould |
| 2007/0154041 A1 | 7/2007 | Beauchamp |
| 2007/0157228 A1 | 7/2007 | Bayer et al. |
| 2007/0157234 A1 | 7/2007 | Walker |
| 2007/0157262 A1 | 7/2007 | Ramaswamy et al. |
| 2007/0180230 A1 | 8/2007 | Cortez |
| 2007/0192103 A1 | 8/2007 | Sato et al. |
| 2007/0199019 A1 | 8/2007 | Angiolillo et al. |
| 2007/0204300 A1 | 8/2007 | Markley et al. |
| 2007/0204308 A1 | 8/2007 | Nicholas et al. |
| 2007/0204314 A1 | 8/2007 | Hasek et al. |
| 2007/0209054 A1 | 9/2007 | Cassanova |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0226365 A1 | 9/2007 | Hildreth et al. |
| 2007/0245376 A1 | 10/2007 | Svendsen |
| 2007/0250880 A1 | 10/2007 | Hainline |
| 2007/0261089 A1 | 11/2007 | Aaby et al. |
| 2007/0261116 A1 | 11/2007 | Prafullchandra et al. |
| 2007/0276925 A1 | 11/2007 | La et al. |
| 2007/0276926 A1 | 11/2007 | LaJoie et al. |
| 2007/0280298 A1 | 12/2007 | Hearn et al. |
| 2007/0288637 A1 | 12/2007 | Layton et al. |
| 2007/0288715 A1 | 12/2007 | Boswell et al. |
| 2007/0294717 A1 | 12/2007 | Hill et al. |
| 2007/0294738 A1 | 12/2007 | Kuo et al. |
| 2007/0299728 A1 | 12/2007 | Nemirofsky et al. |
| 2008/0021836 A1 | 1/2008 | Lao |
| 2008/0022012 A1 | 1/2008 | Wang |
| 2008/0022309 A1 | 1/2008 | Begeja et al. |
| 2008/0027801 A1 | 1/2008 | Walter et al. |
| 2008/0036917 A1 | 2/2008 | Pascarella et al. |
| 2008/0059646 A1 | 3/2008 | Ludvig et al. |
| 2008/0059804 A1 | 3/2008 | Shah et al. |
| 2008/0066095 A1 | 3/2008 | Reinoso |
| 2008/0066112 A1 | 3/2008 | Bailey et al. |
| 2008/0085750 A1 | 4/2008 | Yoshizawa |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092058 A1 | 4/2008 | Afergan et al. |
| 2008/0092181 A1 | 4/2008 | Britt |
| 2008/0098212 A1 | 4/2008 | Helms et al. |
| 2008/0098241 A1 | 4/2008 | Cheshire |
| 2008/0098450 A1 | 4/2008 | Wu et al. |
| 2008/0101460 A1 | 5/2008 | Rodriguez |
| 2008/0101763 A1 | 5/2008 | Bhogal et al. |
| 2008/0109853 A1 | 5/2008 | Einarsson et al. |
| 2008/0112405 A1 | 5/2008 | Cholas et al. |
| 2008/0133551 A1 | 6/2008 | Wensley et al. |
| 2008/0134043 A1 | 6/2008 | Georgis et al. |
| 2008/0134165 A1 | 6/2008 | Anderson et al. |
| 2008/0137541 A1 | 6/2008 | Agarwal et al. |
| 2008/0137740 A1 | 6/2008 | Thoreau et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0168487 A1 | 7/2008 | Chow et al. |
| 2008/0170530 A1 | 7/2008 | Connors et al. |
| 2008/0170551 A1 | 7/2008 | Zaks |
| 2008/0172696 A1 | 7/2008 | Furusawa et al. |
| 2008/0177998 A1 | 7/2008 | Apsangi et al. |
| 2008/0178225 A1 | 7/2008 | Jost |
| 2008/0184344 A1 | 7/2008 | Hernacki et al. |
| 2008/0189617 A1 | 8/2008 | Covell et al. |
| 2008/0192820 A1 | 8/2008 | Brooks et al. |
| 2008/0198780 A1 | 8/2008 | Sato |
| 2008/0200154 A1 | 8/2008 | Maharajh et al. |
| 2008/0201386 A1 | 8/2008 | Maharajh et al. |
| 2008/0201736 A1 | 8/2008 | Gordon et al. |
| 2008/0201748 A1 | 8/2008 | Hasek et al. |
| 2008/0215755 A1 | 9/2008 | Farber et al. |
| 2008/0216119 A1 | 9/2008 | Pfeffer et al. |
| 2008/0216135 A1 | 9/2008 | Pfeffer et al. |
| 2008/0216136 A1 | 9/2008 | Pfeffer et al. |
| 2008/0222684 A1 | 9/2008 | Mukraj et al. |
| 2008/0229379 A1 | 9/2008 | Akhter |
| 2008/0235746 A1 | 9/2008 | Peters et al. |
| 2008/0244667 A1 | 10/2008 | Osborne |
| 2008/0256615 A1 | 10/2008 | Schlacht et al. |
| 2008/0273591 A1 | 11/2008 | Brooks et al. |
| 2008/0279534 A1 | 11/2008 | Buttars |
| 2008/0281971 A1 | 11/2008 | Leppanen et al. |
| 2008/0282299 A1 | 11/2008 | Koat et al. |
| 2008/0294713 A1 | 11/2008 | Saylor et al. |
| 2008/0297669 A1 | 12/2008 | Zalewski et al. |
| 2008/0306903 A1 | 12/2008 | Larson et al. |
| 2008/0313690 A1 | 12/2008 | Tsang et al. |
| 2008/0320523 A1 | 12/2008 | Morris et al. |
| 2008/0320528 A1 | 12/2008 | Kim et al. |
| 2008/0320540 A1 | 12/2008 | Brooks et al. |
| 2009/0006211 A1 | 1/2009 | Perry et al. |
| 2009/0019488 A1 | 1/2009 | Ruiz-Velasco et al. |
| 2009/0025027 A1 | 1/2009 | Craner |
| 2009/0030802 A1 | 1/2009 | Plotnick et al. |
| 2009/0031335 A1 | 1/2009 | Hendricks et al. |
| 2009/0049468 A1 | 2/2009 | Shkedi |
| 2009/0064221 A1 | 3/2009 | Stevens |
| 2009/0070842 A1 | 3/2009 | Corson et al. |
| 2009/0076898 A1 | 3/2009 | Wang et al. |
| 2009/0077583 A1 | 3/2009 | Sugiyama et al. |
| 2009/0083279 A1 | 3/2009 | Hasek |
| 2009/0083811 A1 | 3/2009 | Dolce et al. |
| 2009/0083813 A1 | 3/2009 | Dolce et al. |
| 2009/0086643 A1 | 4/2009 | Kotrla et al. |
| 2009/0094347 A1 | 4/2009 | Ting et al. |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0119703 A1 | 5/2009 | Piepenbrink et al. |
| 2009/0125934 A1 | 5/2009 | Jones et al. |
| 2009/0132347 A1 | 5/2009 | Anderson et al. |
| 2009/0133048 A1 | 5/2009 | Gibbs et al. |
| 2009/0133090 A1 | 5/2009 | Busse |
| 2009/0141696 A1 | 6/2009 | Chou et al. |
| 2009/0150210 A1 | 6/2009 | Athsani et al. |

(56) References Cited

U.S. PATENT DOCUMENTS

| | | |
|---|---|---|
| 2009/0150917 A1 | 6/2009 | Huffman et al. |
| 2009/0151006 A1 | 6/2009 | Saeki et al. |
| 2009/0158311 A1 | 6/2009 | Hon et al. |
| 2009/0172757 A1 | 7/2009 | Aldrey et al. |
| 2009/0172762 A1 | 7/2009 | Assouline et al. |
| 2009/0172776 A1 | 7/2009 | Makagon et al. |
| 2009/0175218 A1 | 7/2009 | Song et al. |
| 2009/0178089 A1 | 7/2009 | Picco et al. |
| 2009/0185576 A1 | 7/2009 | Kisel et al. |
| 2009/0187939 A1 | 7/2009 | Lajoie |
| 2009/0187944 A1 | 7/2009 | White et al. |
| 2009/0193097 A1 | 7/2009 | Gassewitz et al. |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0228941 A1 | 9/2009 | Russell et al. |
| 2009/0235308 A1 | 9/2009 | Ehlers et al. |
| 2009/0248794 A1 | 10/2009 | Helms et al. |
| 2009/0271826 A1 | 10/2009 | Lee et al. |
| 2009/0282241 A1 | 11/2009 | Prafullchandra et al. |
| 2009/0282449 A1 | 11/2009 | Lee |
| 2009/0293101 A1 | 11/2009 | Carter et al. |
| 2009/0296621 A1 | 12/2009 | Park et al. |
| 2009/0307318 A1 | 12/2009 | Chappell et al. |
| 2009/0327057 A1 | 12/2009 | Redlich |
| 2009/0328105 A1 | 12/2009 | Craner et al. |
| 2010/0005499 A1 | 1/2010 | Covey |
| 2010/0011388 A1 | 1/2010 | Bull et al. |
| 2010/0012568 A1 | 1/2010 | Fujisawa et al. |
| 2010/0027560 A1 | 2/2010 | Yang et al. |
| 2010/0027787 A1 | 2/2010 | Benkert et al. |
| 2010/0030578 A1 | 2/2010 | Siddique et al. |
| 2010/0031299 A1 | 2/2010 | Harrang et al. |
| 2010/0036720 A1 | 2/2010 | Jain et al. |
| 2010/0042478 A1 | 2/2010 | Reisman |
| 2010/0043030 A1 | 2/2010 | White |
| 2010/0046927 A1 | 2/2010 | Manthoulis |
| 2010/0082635 A1 | 4/2010 | Elsner et al. |
| 2010/0083329 A1 | 4/2010 | Joyce et al. |
| 2010/0083362 A1 | 4/2010 | Francisco et al. |
| 2010/0086020 A1 | 4/2010 | Schlack |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0115540 A1 | 5/2010 | Fan et al. |
| 2010/0121936 A1 | 5/2010 | Liu et al. |
| 2010/0122274 A1 | 5/2010 | Gillies et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0131983 A1 | 5/2010 | Shannon et al. |
| 2010/0132003 A1 | 5/2010 | Bennett et al. |
| 2010/0135646 A1 | 6/2010 | Bang et al. |
| 2010/0138900 A1 | 6/2010 | Peterka et al. |
| 2010/0145917 A1 | 6/2010 | Bone et al. |
| 2010/0146541 A1 | 6/2010 | Velazquez |
| 2010/0162294 A1 | 6/2010 | Yin et al. |
| 2010/0162367 A1 | 6/2010 | Lajoie et al. |
| 2010/0169503 A1 | 7/2010 | Kollmansberger et al. |
| 2010/0169977 A1 | 7/2010 | Dasher et al. |
| 2010/0186029 A1 | 7/2010 | Kim et al. |
| 2010/0198655 A1 | 8/2010 | Ketchum et al. |
| 2010/0199299 A1 | 8/2010 | Chang et al. |
| 2010/0199312 A1 | 8/2010 | Chang et al. |
| 2010/0217613 A1 | 8/2010 | Kelly |
| 2010/0218231 A1 | 8/2010 | Frink et al. |
| 2010/0219613 A1 | 9/2010 | Zaloom et al. |
| 2010/0251304 A1 | 9/2010 | Donoghue et al. |
| 2010/0251305 A1 | 9/2010 | Kimble et al. |
| 2010/0262461 A1 | 10/2010 | Bohannon |
| 2010/0262999 A1 | 10/2010 | Curran |
| 2010/0269144 A1 | 10/2010 | Forsman et al. |
| 2010/0280641 A1 | 11/2010 | Harkness et al. |
| 2010/0287588 A1 | 11/2010 | Cox et al. |
| 2010/0287609 A1 | 11/2010 | Gonzalez et al. |
| 2010/0293494 A1 | 11/2010 | Schmidt |
| 2010/0312826 A1 | 12/2010 | Sarosi et al. |
| 2010/0313225 A1 | 12/2010 | Cholas et al. |
| 2010/0325547 A1 | 12/2010 | Keng et al. |
| 2010/0333137 A1 | 12/2010 | Hamano et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0055866 A1 | 3/2011 | Piepenbrink et al. |
| 2011/0058675 A1 | 3/2011 | Brueck et al. |
| 2011/0071841 A1 | 3/2011 | Fomenko et al. |
| 2011/0078001 A1 | 3/2011 | Archer et al. |
| 2011/0078005 A1 | 3/2011 | Klappert |
| 2011/0078731 A1 | 3/2011 | Nishimura |
| 2011/0083069 A1 | 4/2011 | Paul et al. |
| 2011/0083144 A1 | 4/2011 | Bocharov et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0102600 A1 | 5/2011 | Todd |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0110515 A1 | 5/2011 | Tidwell et al. |
| 2011/0126018 A1 | 5/2011 | Narsinh et al. |
| 2011/0126244 A1 | 5/2011 | Hasek |
| 2011/0126246 A1 | 5/2011 | Thomas et al. |
| 2011/0138064 A1 | 6/2011 | Rieger et al. |
| 2011/0145049 A1 | 6/2011 | Hertel et al. |
| 2011/0154383 A1 | 6/2011 | Hao et al. |
| 2011/0166932 A1 | 7/2011 | Smith et al. |
| 2011/0173053 A1 | 7/2011 | Aaltonen et al. |
| 2011/0173095 A1 | 7/2011 | Kassaei et al. |
| 2011/0178943 A1 | 7/2011 | Motahari et al. |
| 2011/0191801 A1 | 8/2011 | Vytheeswaran |
| 2011/0212756 A1 | 9/2011 | Packard et al. |
| 2011/0213688 A1 | 9/2011 | Santos et al. |
| 2011/0219229 A1 | 9/2011 | Cholas et al. |
| 2011/0219411 A1 | 9/2011 | Smith |
| 2011/0223944 A1 | 9/2011 | Gosselin |
| 2011/0231660 A1 | 9/2011 | Kanungo |
| 2011/0239253 A1 | 9/2011 | West et al. |
| 2011/0246616 A1 | 10/2011 | Ronca et al. |
| 2011/0258049 A1 | 10/2011 | Ramer et al. |
| 2011/0264530 A1 | 10/2011 | Santangelo et al. |
| 2011/0265116 A1 | 10/2011 | Stern et al. |
| 2011/0276881 A1 | 11/2011 | Keng et al. |
| 2011/0277008 A1 | 11/2011 | Smith |
| 2011/0302624 A1 | 12/2011 | Chen et al. |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0023535 A1 | 1/2012 | Brooks |
| 2012/0030363 A1 | 2/2012 | Conrad |
| 2012/0042337 A1 | 2/2012 | De Bonet et al. |
| 2012/0072526 A1 | 3/2012 | Kling et al. |
| 2012/0076015 A1 | 3/2012 | Pfeffer |
| 2012/0079523 A1 | 3/2012 | Trimper et al. |
| 2012/0084828 A1 | 4/2012 | Rowe et al. |
| 2012/0089699 A1 | 4/2012 | Cholas |
| 2012/0096106 A1 | 4/2012 | Blumofe et al. |
| 2012/0096499 A1 | 4/2012 | Dasher et al. |
| 2012/0124149 A1 | 5/2012 | Gross et al. |
| 2012/0124606 A1 | 5/2012 | Tidwell et al. |
| 2012/0124612 A1 | 5/2012 | Adimatyam et al. |
| 2012/0131139 A1 | 5/2012 | Siripurapu et al. |
| 2012/0137332 A1 | 5/2012 | Kumar |
| 2012/0144195 A1 | 6/2012 | Nair et al. |
| 2012/0144416 A1 | 6/2012 | Wetzer et al. |
| 2012/0151077 A1 | 6/2012 | Finster |
| 2012/0166530 A1 | 6/2012 | Tseng et al. |
| 2012/0167132 A1 | 6/2012 | Mathews et al. |
| 2012/0170544 A1 | 7/2012 | Cheng et al. |
| 2012/0170741 A1 | 7/2012 | Chen et al. |
| 2012/0173746 A1 | 7/2012 | Salinger et al. |
| 2012/0185693 A1 | 7/2012 | Chen et al. |
| 2012/0185899 A1 | 7/2012 | Riedl et al. |

(56) References Cited

U.S. PATENT DOCUMENTS

| | | |
|---|---|---|
| 2012/0191844 A1 | 7/2012 | Boyns et al. |
| 2012/0197980 A1 | 8/2012 | Terleski et al. |
| 2012/0215878 A1 | 8/2012 | Kidron |
| 2012/0215903 A1 | 8/2012 | Fleischman et al. |
| 2012/0240176 A1 | 9/2012 | Ma et al. |
| 2012/0246462 A1 | 9/2012 | Moroney et al. |
| 2012/0278833 A1 | 11/2012 | Tam et al. |
| 2012/0284804 A1 | 11/2012 | Lindquist et al. |
| 2012/0308071 A1 | 12/2012 | Ramsdell et al. |
| 2012/0324552 A1 | 12/2012 | Padala et al. |
| 2013/0014140 A1 | 1/2013 | Ye et al. |
| 2013/0014171 A1 | 1/2013 | Sansom et al. |
| 2013/0024888 A1 | 1/2013 | Sivertsen |
| 2013/0024891 A1 | 1/2013 | Elend et al. |
| 2013/0024901 A1 | 1/2013 | Sharif-Ahmadi et al. |
| 2013/0031578 A1 | 1/2013 | Zhu et al. |
| 2013/0039338 A1 | 2/2013 | Suzuki et al. |
| 2013/0046849 A1 | 2/2013 | Wolf et al. |
| 2013/0067039 A1 | 3/2013 | Hartzler et al. |
| 2013/0073400 A1 | 3/2013 | Heath |
| 2013/0097647 A1 | 4/2013 | Brooks et al. |
| 2013/0117692 A1 | 5/2013 | Padmanabhan et al. |
| 2013/0132986 A1 | 5/2013 | Mack et al. |
| 2013/0133010 A1 | 5/2013 | Chen |
| 2013/0166906 A1 | 6/2013 | Swaminathan et al. |
| 2013/0167168 A1 | 6/2013 | Ellis et al. |
| 2013/0173745 A1 | 7/2013 | Biderman |
| 2013/0174271 A1 | 7/2013 | Handal et al. |
| 2013/0179588 A1 | 7/2013 | McCarthy et al. |
| 2013/0198770 A1 | 8/2013 | Xiong et al. |
| 2013/0219178 A1 | 8/2013 | Xiques et al. |
| 2013/0227283 A1 | 8/2013 | Williamson et al. |
| 2013/0227284 A1 | 8/2013 | Pfeffer et al. |
| 2013/0254815 A1 | 9/2013 | Pfeffer et al. |
| 2013/0311464 A1 | 11/2013 | Nix et al. |
| 2014/0012843 A1 | 1/2014 | Soon-Shiong |
| 2014/0059055 A1 | 2/2014 | Nag et al. |
| 2014/0074855 A1 | 3/2014 | Zhao et al. |
| 2014/0201799 A1 | 7/2014 | Smith |
| 2014/0230003 A1 | 8/2014 | Ma et al. |
| 2014/0245341 A1 | 8/2014 | Mack et al. |
| 2014/0259182 A1 | 9/2014 | Mershon |
| 2014/0282777 A1 | 9/2014 | Gonder et al. |
| 2014/0282784 A1 | 9/2014 | Pfeffer |
| 2014/0344857 A1 | 11/2014 | Kanojia et al. |
| 2014/0351437 A1 | 11/2014 | Madani et al. |
| 2015/0020126 A1 | 1/2015 | Kegel et al. |
| 2015/0040176 A1 | 2/2015 | Hybertson et al. |
| 2015/0095932 A1 | 4/2015 | Ren |
| 2015/0109122 A1 | 4/2015 | Stern et al. |
| 2015/0161386 A1 | 6/2015 | Gupta et al. |
| 2015/0163540 A1 | 6/2015 | Masterson |
| 2016/0241617 A1 | 8/2016 | Jelley et al. |
| 2017/0048357 A1 | 2/2017 | Pfeffer et al. |
| 2017/0070773 A1 | 3/2017 | Phillips et al. |
| 2019/0098505 A1 | 3/2019 | Mars et al. |
| 2019/0171341 A1 | 6/2019 | Eubanks |

FOREIGN PATENT DOCUMENTS

| | | |
|---|---|---|
| JP | 2001275090 A | 10/2001 |
| JP | 2005519365 A | 6/2005 |
| JP | 2005519501 A | 6/2005 |
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-9935846 A1 | 7/1999 |
| WO | WO-0011871 A1 | 3/2000 |
| WO | WO-0052928 A1 | 9/2000 |
| WO | WO-0110125 A1 | 2/2001 |
| WO | WO-0139505 A2 | 5/2001 |
| WO | WO-0156285 A1 | 8/2001 |
| WO | WO-0195610 A1 | 12/2001 |
| WO | WO-0195621 A1 | 12/2001 |
| WO | WO-2005015422 A1 | 2/2005 |
| WO | WO-2005031524 A2 | 4/2005 |
| WO | WO-2007060451 A2 | 5/2007 |
| WO | WO-2010008487 A1 | 1/2010 |
| WO | WO-2011035443 A1 | 3/2011 |
| WO | WO-2011053858 A1 | 5/2011 |
| WO | WO-2012021245 A1 | 2/2012 |
| WO | WO-2012114140 A1 | 8/2012 |
| WO | WO-2021084326 A1 | 5/2021 |

OTHER PUBLICATIONS

Apple Inc., HTTP Live Streaming Overview, Apr. 1, 2011.
Buss D., "Ultra TV", Brand marketing, Sep. 1999, vol. 6, No. 9, pp. 76-79.
Cantor, et al., Bindings for the OASIS Security Assertion Markup Language (SAML) V2.0, OASIS Standard, Mar. 2005, DocumentID saml-bindings-2.0-os , (http://docs.oasis-open.org/security/saml/v2.0/saml-bindings-2.0-os.pdf).
DLNA (Digital Living Network Alliance) protocols described in DLNA Networked Device Interoperability Guidelines Expanded, Mar. 2006 and subsequent expanded version dated Oct. 2006.
DOCSIS 3.0 Management Features Differences Technical Report CM-TR-MGMTv3 0-DIFF-V01-071228, pp. 1-62.
DOCSIS 3.0 OSSI Configuration Management Technical Report CM-TR-OSSIv3 0-CM-V01-080936, pp. 1-84.
Extended European Search Report for Application No. EP13155950, dated Jun. 14, 2013, 6 pages.
Florin L., et al., "Content Delivery and Management in Networked MPEG-4 System," 2000 10th European Signal Processing Conference, IEEE, Sep. 4, 2000 (Sep. 4, 2000), pp. 1-4, XP032755920, ISBN: 978-952-15-0443-3 [retrieved on Mar. 31, 2015].
Flynn M. K., et al., "Interactive TV, CNNFn", Transcript #00081407FN-111 Interview Josh Bernoff, Digital Jam, Aug. 14, 2000, pp. 21-24.
Furchgott R., "Don't Want People to Control Their T.V.s?," The New York Times, Aug. 24, 2000, Section G, col. 2, pp. 3-8.
Gopikrishnan P., et al., "Scaling of the Distribution of Fluctuations of Financial Market Indices," Physical Review E., Nov. 1999, vol. 60(5), pp. 5305-5316.
Gunther M., et al., "When Technology Attacks!; Your T.V. is Looking Weird. Network Executives are Getting Flustered. Viewing Choices are Exploding. That's What Happens . . . ," Fortune, Mar. 6, 2000, Section: Features/Television, pp. 39-44.
"Independent Study Shows TiVo Service Increases Enjoyment and Changes People's Attitudes Towards T.V.", PR Newswire, May 2, 2000, 2000 FT Asia Intelligence Wire; 2000 PR Newswire, pp. 33-35.
Kale C., et al., "RFC 1180, A TCP/1P Tutorial," Jan. 1991, Spider Systems Limited, Section 4, pp. 1-22.
Larsen P. T., "Inside Track: TV Viewers Can Box Clever: Technology Video Recorders: Personal Video Recorders will be a Godsend for Viewers. But What About the Schedulers," Financial Times London Ed., Jun. 23, 2000, pp. 30-32.
LEXIS:NEXIS, "Future VOD Role of Studios vs. Other Companies Debated," Video Week, Apr. 10, 2000, Section: This Week's News, 2000 Warren Publishing, Inc., pp. 36-38.
Lowry B., et al., "Television, as You Like It; Today's Gadgetry is Smart Enough to Let Viewers Choose Camera Angles, or Kick Back and Rewind as the Action Unfolds Live. Watch It, and It Watches Back," Times Mirror Company. Feb. 13, 2000, pp. 45-50.
"More 'Convergence' Digital Video Recorders Emerge," Video Week, Jun. 19, 2000, section: This Week's News, 2000 Warren Publishing, Inc., pp. 57-60.
MPEG Headers Quick Reference, http://dvd.sourceforge.net/dvdinfo/mpeghdrs.html, Mar. 6, 2006.
Opencable, Enhanced TV Binary Interchange, Format 1.0 OC-SP-ETV-BIF1.0-104-070921 Date: Sep. 21, 2007, 420 pages.
OpenCable Specifications, Alternate Content, Real-Time Event Signaling and Management API, OC-SP-ESAM-API-I01-120910 (2012).

(56) References Cited

OTHER PUBLICATIONS

OpenCable Specifications, Tuning Resolver Interface Specification, OS-SP-TRIF-I01-080130, Jan. 30, 2008, pp. 1-50.
Pantjiaros C.A. P., et al., "Broadband Service Delivery: CY.T.A. ADSL Field Trial Experience", Electrotechnical Conference, 2000 MELECON, 2000 10th Mediterranean, May 29-31, 2000, Piscataway, NJ, USA,IEEE, vol. 1, May 29, 2000 (May 29, 2000), pp. 221-224, XP010518859, ISBN: 978-0-7803-6290-1.
"PVR Copyright Concerns Raised," Audio Week, Aug. 23, 1999, section: This Week's News, 1999 Warren Publishing, Inc., pp. 51-53.
Ramakrishnan K. K., et al., "Operating System Support for a Video-On-Demand File Service," Digital Equipment Corporation, 1995, 19 pages. ("CMFAP").
Redux Screenshot from http://www.redux.com, "Select a Channel to Start Watching" © 2014 Redux, Inc.014 Redux, Inc. All rights reserved; http://www.redux.com, 2 pages.
Sabga P., et al., "TiVo—CEO, CNNfn," Transcript # 000901 10FN-107 Interview Michael Ramsay, The N.E.W. Show, Sep. 1, 2000, Friday 5:18 p.m. EST, 2000 Cable News Network, pp. 16-18.
Schonfeld E., "Thuuz Tells Sports Fans if a Game is Worth Watching," Oct. 7, 2010, TC News from http://techcrunch.com/2010/10/07/thuuz, 2 pages.
SCTE American National Standard ANSI/SCTE 118-2 2007.
SCTE American National Standard ANSI/SCTE 130-1 2008.
SCTE, American National Standard, ANSI/SCTE 35 2012.
Siebenlist F., et al., "Global Grid Forum Specification Roadmap towards a Secure OGSA," Jul. 2002, pp. 1-22.
Snoddy R., "The TiVo—T.V.'s nemesis?", Times Newspapers Ltd., Sep. 1, 2000, Section: Features, 2000 Times Newspapers Limited (the Times London), pp. 19-20.
"TiVo and Replay Sign Cable Deals to Boost PVR Distribution," Warren's Cable Regulation Monitor, Aug. 21, 2000, Section: This Week's News, 2000 Warren Publishing, Inc., 2 pages.
UTF-32, IBM, retrieved from http://publib.boulder.ibm.com/infocenter/iseries/v5r3/index.jsp?topic=%2Fnls%2Frbagsutf32.htm on Aug. 28, 2013.
Zarnbelli, The Apparatus and Methods of HS Smooth Streaming Technical Overview, Mar. 2009.

\* cited by examiner

APPARATUS AND METHODS FOR DATA COLLECTION, ANALYSIS AND SERVICE MODIFICATION BASED ON ONLINE ACTIVITY

PRIORITY APPLICATION

This application claims priority to commonly owned U.S. Provisional Patent Application Ser. No. 62/116,212, titled "APPARATUS AND METHODS FOR DETECTION AND REMEDIATION OF ILLICIT ONLINE ACTIVITY", filed on Feb. 13, 2015, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data (for example, Internet data or other content) delivery over a network. More particularly, the present disclosure is related in one exemplary aspect to apparatus and methods for modifying services provided to a user or subscriber of a managed network based on online activity associated therewith.

2. Description of Related Technology

Recent advances in digital information processing and technology have made a range of services and functions available for delivery to consumers at their premises for very reasonable prices or subscription fees. These services and functions include high-speed Internet access, provision of digital content or programming (movies, etc.), digital video-on-demand (VOD), Internet Protocol television (IPTV), and IP-based telephony (e.g., VoIP). Other services available to network users include access to, and recording of, digital music (e.g., MP3 files), as well as local area networking (including wire-line and wireless local area networks) for distributing these services throughout the user's premises, and beyond. Network-delivered or network-based gaming and applications ("apps") have also each recently come to the forefront as popular content areas for users.

Currently, many of these services are provided and delivered to the users via a wide variety of different equipment environments including, inter alia, cable modems, Wi-Fi® hubs, Ethernet hubs, gateways, switches and routers, computers, servers, cable or satellite networks and associated set-top boxes.

In providing access to content over digital information sources, a breach in security of a single device may threaten to or may cause actual harm to other devices in the system. One particularly acute problem relates to surreptitious use of so-called "bots" (robots) on client systems throughout a network. Different types of bots exist in data networks such as the Internet, and are often characterized by (unknowing) implantation on a user's device (e.g., PC, laptop, etc.), and subsequent activity under the direction of a remote "command and control" bot. Once implanted on the user's computer or other device (such as via the user opening a Trojan or similar virus file or clicking on a link which causes the download of malicious code), the bot can be subsequently activated by the command and control bot (or even autonomously), and used for surreptitious activity such as advertising fraud, distributed denial of service (DDoS) attacks, etc., all without the user's knowledge. In effect, a "network of bots" distributed across numerous user platforms is created, and when implemented can cause any number of undesirable effects on the network, third party users of the network (e.g., advertisers), and even the users (subscribers) themselves. Such bots are often undetectable via standard anti-virus software, and hence remediation (rather than prevention) is often employed for mitigating the effects of such activity.

One type of bot often seen is the so-called ad bot (advertising bot) that fraudulently activates or clicks on advertising without host (e.g., user computer) knowledge. This activity can, inter alia, corrupt advertising revenue schemes put in place by the advertiser. For instance, if paying on a "per-click" basis for traffic from users of a given managed network or placement site, one or more bots repetitively clicking on an advertisement will not only skew the data regarding user interest or use in the advertisement, but also potentially cause the advertiser to pay more than they would otherwise due to the malicious activity. Such factors often give advertisers a negative opinion or rating of a given delivery platform (e.g., network), and hence they may avoid further use of that platform in the future. Advertisers need a level of assurance that customers of a given managed network (e.g., cable MSO network) and sites served by that network are free of fraud, since they are ostensibly spending significant sums to have their ads placed in various instances within content or sites operated by that network and accessed by the network's users. In that managed network operators generate significant revenue from third-party advertisers, losing such advertisers due to malicious bot or other infections can be devastating to revenue and profitability.

Likewise, users having computers or other devices connected to the network may experience degradation of performance (in that the bot, when running in the background, is consuming resources of the computer and communications bandwidth), as well as other undesirable effects such as frequent (false) pop-up windows, Internet browser "spoofing" or redirect attacks, and the like, all leading to greatly reduced customer satisfaction.

In that the level of sophistication of such malicious activity has increased over time, it is often not even the user's fault that their machine has become infected with a bot or other malicious code. The differences between legitimate and fraudulent websites, pop-ups, links, etc. are often (intentionally) quite subtle, and tend to spur the user into immediate action so as to ostensibly correct some "glaring" deficiency (e.g., "virus detected—click here to quarantine the virus!").

Hence, it is a critical goal of service providers to defend themselves as well as their clients (both users and other third parties such as advertisers) against such harmful behavior.

As noted above, remediation of a given user's activity is often times required (e.g., electronically sequestration of their machine, removal of the malicious code, etc.), in that the infection or malicious activity is not detected until well after initial infection and implementation. Signature detection (e.g., classifying a PC or other device as having a bot infection based on evaluation of its activity) and remediation (e.g., communicating to customer that they have infection, and correction/prevention of security breach to enhance network security) are commonly used in such cases, and are known in the prior art. However, such mechanisms are largely reactive, and do little if anything to prevent or mitigate future infections.

Further, such remediation often consumes significant time and resources of the service provider, including potentially (human) technical support and even a "truck roll" (i.e., service call). Such consumption of resources necessarily reduces the service provider's profitability, especially when considered across the millions of users of a typical large managed (e.g., cable or satellite) content delivery network.

Moreover, any attempts at anticipatory or proactive remediation or corrective action under prior art "manual" processing would be so laborious as to make provision of the aforementioned functions practically impossible. Even if such analysis could be performed manually or semi-manually, speed of identification of fraudulent activity and processing (including remediation or implementation of other defensive or anticipatory corrective measures) is often critical, and hence any effective solution is necessarily incompatible with the long delays associated with the primarily manual processing used in the prior art.

Hence, what is needed is a complementary "proactive" approach to mitigating or preventing illicit online activity. Ideally, such methods would provide a dynamic mechanism that could be at least partly employed using computer and networking technologies, so as to enable substantially automated and real-time detection and pre-emptive/corrective action, as well as identification of repeat-offending users or computers (and treatment of such users in a manner commensurate with their potential for infection by malicious code).

SUMMARY

The present disclosure addresses the foregoing needs by disclosing, inter alia, apparatus and methods for modifying services based on collected data relating to online activity.

In one aspect of the disclosure, a computerized system for, inter alia, managing network users is disclosed. In one embodiment, the system comprises a database or group of databases comprised of data drawn and aggregated from multiple sources, and one or more algorithms operative to run on a computerized platform (e.g., server) and configured to rate a particular device and/or user's security or trustworthiness.

In one variant, mechanisms are implemented to, based at least on the aforementioned rating, treat a given user or account in a manner differing from other users (e.g., by offering additional services to users and/or devices that have maintained responsible online activity, by causing users who have poor rating to be restricted to types of services that are more resilient to malicious attacks, or even termination of a user as a network subscriber).

In a second aspect, a computerized analytics "engine" is disclosed. In one embodiment, the engine comprises a plurality of computer algorithms operative to run on a computerized platform (e.g., server or server farm) and configured to utilize data from a multi-layer data structure to assess individual ones of users of a service provider network (as well as broader logical groups or aggregations of users). In one variant, the engine is disposed on one or more servers within a managed content delivery network and is operative to execute such that substantially real-time analysis and recommendations can be generated for numerous individual subscribers of the network in parallel.

In a further aspect, a data architecture and corresponding database is disclosed. In one embodiment, the data architecture comprises a multi-layered architecture having at least first, second, third, and fourth logical layers, each of which can both interface with a previous and/or successive logical layer, as well as with external processes or entities. In one variant, each of the layers can at least output information without subsequent processing, and/or pass data on to another layer for subsequent processing, and the first, second, third and fourth layers comprise raw data, data transformation, analytics, and distribution layers, respectively. Data in the raw (or "load") layer is ingested from any number of data sources internal to the managed network infrastructure or external thereto. Transformation of this raw data (e.g., normalization of formatting, type, etc.) occurs in the subsequent transformation layer processing, while analysis and evaluation of the transformed data is subsequently performed in the analytics layer (e.g., by the aforementioned analytics engine).

In yet another aspect of the disclosure, a method of substantially automatically aggregating and processing data relating to user online activity are disclosed. In one embodiment, the method includes: obtaining data from a plurality of different data sources; pre-processing the data; analyzing the pre-processed data using one or more analytic routines to generate one or more categorizations (e.g., of subscribers within the aforementioned managed network); and post-processing the analyzed data to generate one or more outputs (products).

In one variant of the method, the pre-processing comprises data transformation and normalization, and the post-processing comprises aggregation of individual user data, and partitioning of all or portions of the aggregated data into subsets based on, e.g., geographic region or location, type of illicit online activity or threat, etc.

In a further aspect of the disclosure, a method of substantially automatically generating one or more logical structures relating to user online activity are disclosed. In one embodiment, the method includes: obtaining data from a plurality of different data sources; pre-processing the data; analyzing the pre-processed data using one or more analytic routines to generate one or more categorizations (e.g., of subscribers within the aforementioned managed network); utilizing the results of the analysis to implement one or more logical structures or management plans for pre-emptive or corrective action relating to one or more of the subscribers. In one variant, the logical structures comprise interactive voice response (IVR) and/or human customer service representative (CSR) instructions (the latter implemented e.g., via on-screen instructions provided to the CSR during interaction with a particular subscriber or class of subscriber.

In another variant, the logical structures comprise operational schemes or templates which can be applied to individual users (or classes of users) so as to treat them appropriately given prior (or even ongoing) behavior, such as e.g., modifying their available online services and/or feature set so as to reduce the chance of future undesirable behavior, or alternatively reward them for exemplary online behavior.

In another aspect of the disclosure, a method of operating a service provider network is disclosed. In one embodiment, the method is employed to maximize one or more financial attributes or metrics (e.g. revenue, profitability, etc.), and includes implementation of heterogeneous management plans with respect to respective individual users (or groups of users) served by the network. In one variant, the heterogeneous management plans include: (i) termination of subscription or services; (ii) modification of features or services (e.g., so as to reduce the probability of future undesirable behaviors including infection by malicious code elements); and (iii) rewards or enhancement of features/services for users (or groups of users) who exhibit desirable behavior with respect to online activity.

In yet a further aspect, a method for providing targeted advertising, promotions, or other content is disclosed. In one embodiment, the method includes: correlating network user activity to one or more behaviors; identifying advertising or other content contextually related to the one or more correlated behaviors; and providing the advertising via one or more electronic media to the relevant user(s). In one variant, the advertising is presented to the user in a similar context as the user activity has occurred or is occurring (e.g., online via browser). In another variant, the advertising is provided along with presentation of a user's monthly electronic invoice.

In another aspect of the disclosure, a computer readable apparatus comprising at least one computer program for modifying services based on collected data relating to online activity is disclosed.

In a further aspect, an activity manager collects, analyzes, and generates a plurality of data relating to the online activity of a plurality of client devices in communication therewith. In one embodiment, the activity manager collects raw data from different data sources, e.g., open sources connected to the internet, email services, customer care tools, etc. The activity manager normalizes the raw data to prepare the raw data for correlation with other additional data such as subscriber information. The activity manager may partition the correlated data based on variable partitioning criteria such as locations of subscribers, threat levels, customer types, service types, etc. The activity manager determines a level of illicit online activity associated with each of the plurality of client devices based on the data and enables remediation to be performed and/or alerts or information to be provided to the network, device, and/or user.

In another embodiment, a weighting factor is applied to the individual ones of the plurality of data, e.g., the correlated data. The weighting factor may be provided in advance by a managed network entity. An aggregate score for each user and/or device is generated based on the activity records collected therefrom when weighted using the appropriate weighting factors.

In one variant, each user and/or device is associated with a single cumulative score derived from a profile which takes into account both positive and negative activity. Alternatively, each user and/or device may be associated with separate scores derived from a first profile indicative of positive activity and a second profile indicative of negative activity.

These and other aspects of the disclosure shall become apparent when considered in light of the detailed description provided herein.

Figure 1:
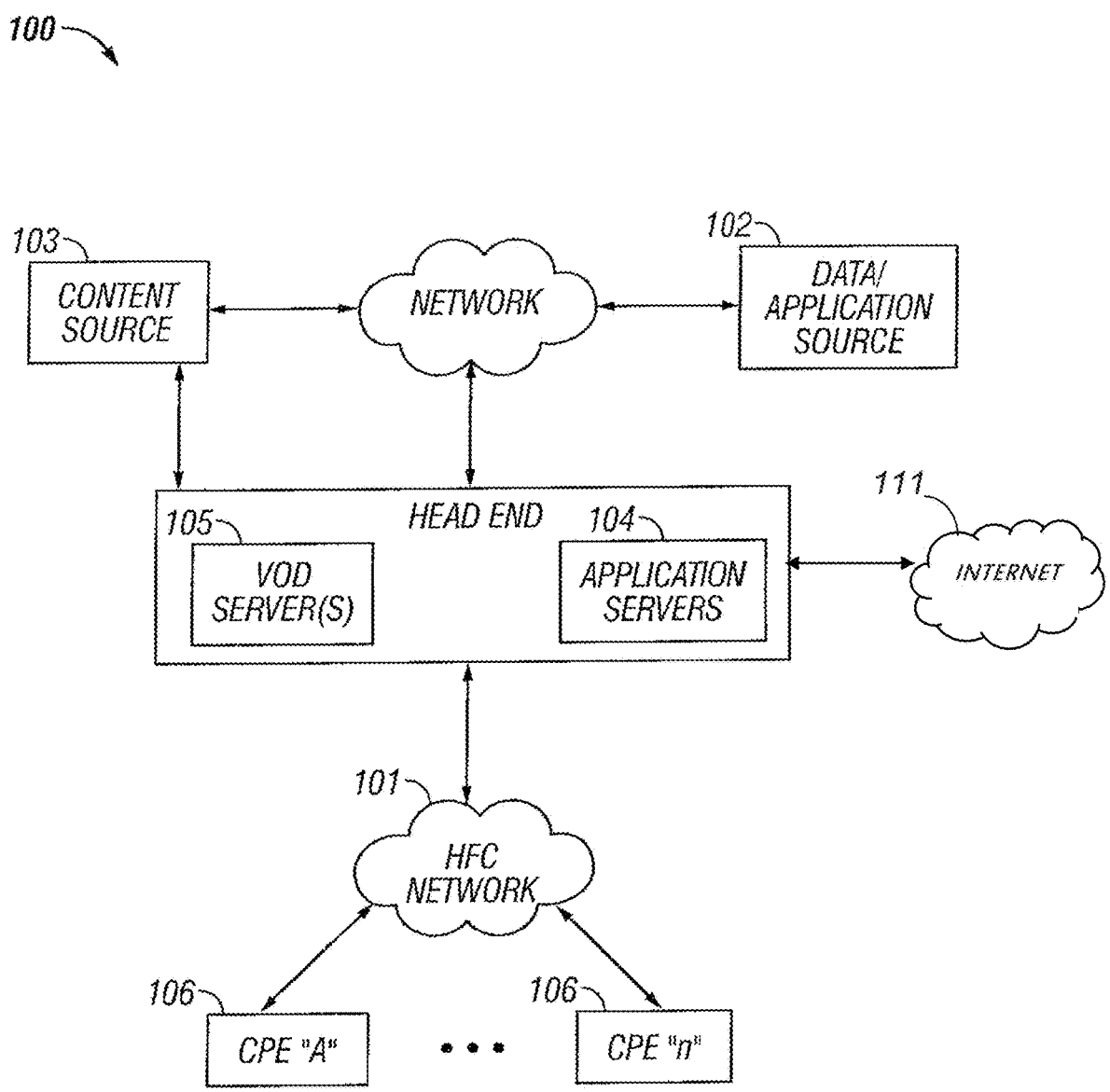
FIG. 1 is a functional block diagram illustrating an exemplary hybrid fiber network configuration useful with various aspects of the present disclosure.

All Figures © Copyright 2014-2016 Time Warner Cable Enterprises LLC. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, digital set-top boxes (e.g., DSTBs), personal computers (PCs), and minicomputers, whether desktop, laptop, or otherwise, and mobile devices such as handheld computers, tablets, personal digital assistants (PDAs), personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), C#, and the like.

The terms "consumer premises equipment" (CPE) and "consumer device" refer without limitation to any type of electronic equipment for use within a consumer's or user's premises and connected to a content distribution network. The term "consumer device" includes terminal devices that have access to digital television content via a satellite, cable, or terrestrial network. The term "consumer premises equipment" (CPE) includes such electronic equipment such as set-top boxes (e.g., DSTBs or IPTV devices), televisions, cable modems (CMs), embedded multimedia terminal adapters (eMTAs), whether stand-alone or integrated with other devices, digital video recorders (DVR), gateway storage devices, and ITV personal computers.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose complex instruction set computing (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2, USB 3.0), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., LTE/LTE-A, 3GPP, 3GPP2, UMTS), or IrDA families.

As used herein, the terms "personal media device" and "PMD" refer to, without limitation, any device, whether portable or otherwise, capable of storing and/or rendering media.

As used herein, the term "server" refers to, without limitation, any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/s/v/ac or 802.11-2012, as well as so-called "Wi-Fi Direct", each of the foregoing incorporated herein by reference in its entirety.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee, RFID/NFC, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one salient aspect, the present disclosure provides apparatus and methods for collecting data relating to online behavior associated with a number of users of a service provider network, evaluating the data, and creating one or more management or action plans based thereon, so as to both avoid (or at least mitigate) the effects of malicious computer infections of the users within the network, and also engender the desired type of behavior within the network user population in the future. As discussed above, the prior art fails to provide a substantially real-time, preventive (versus reactive) approach to management and assessment of user online behavior in the context of large, multi-user service provider networks such as cable, satellite or similar networks. Such networks have millions of subscribers (and hence online users), and remediation of their online activity, "indiscretions" or carelessness can often place a significant cost and time burden on the network operator, as well as potentially comprising the integrity of the network for services such as advertising placement by third parties.

In one exemplary embodiment, the methods an apparatus disclosed herein leverage both a variety of available third-party data sources and products, as well as indigenously developed data relating to individual network subscribers (or larger subsets of the subscriber population) to, inter alia, correlate certain types of subscriber behavior to certain known "high risk" outcomes in a substantially automated and real-time fashion. This correlation enables timely generation and implementation of subscriber management plans for a multitude of subscribers within the network simultaneously, thereby providing a heretofore unavailable operational capability and visibility for the network operator.

Moreover, the foregoing analysis and correlation can be used as the basis for "products" that can be provided to other network operators, service providers, or entities (whether free or for consideration), including third party advertisers.

In one regard, the methods and apparatus of the present disclosure advantageously enable some degree of "subscriber shaping", whether through (i) modification of extant subscriber behavior, (ii) elimination of extant subscribers (based on e.g., limited or negative return-on-investment or ROI given their constant need for remediation efforts), and/or (iii) attraction of new subscribers with more desirable qualities in terms of online behavior, risk profile, and hence ROI for the network operator.

Methodologies for characterizing user activity in e.g., data records, and for rating and remediation of particular users or groups of users, are also provided herein.

Detailed Description of Exemplary Embodiments

Exemplary embodiments of the apparatus and methods of the present disclosure are now described in detail. While these exemplary embodiments are described in the context of a managed content distribution network (e.g., hybrid fiber coax (HFC) cable) architecture having a multiple systems operator, digital networking capability, and plurality of client devices/CPE, and Internet delivery via e.g., RF QAM and DOCSIS cable modem, the general principles and advantages of the disclosure may be extended to other types of networks, architectures and applications, whether broadband, narrowband, wired or wireless, terrestrial or satellite, managed or unmanaged (or combinations thereof), or otherwise, the following therefore being merely exemplary in nature.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

It will also be recognized that while described primarily in the context of a relational database, the various aspects of the disclosure may be implemented using other types or constructs of databases, whether alone or in combination with a relational database.

Bearer Network

FIG. 1 illustrates a typical content delivery network configuration useful for provision of IP-based services (such as Internet access) according to the present disclosure. The various components of the network 100 include: (i) one or more data and application origination points 102; (ii) one or more content sources 103; (iii) one or more application distribution servers 104; (iv) one or more VOD servers 105; and (v) customer premises equipment (CPE) 106. The distribution server(s) 104, VOD servers 105, and CPE(s) 106 are connected via a bearer (e.g., HFC) network 101. An interface to the Internet 111 is also provided within the network (e.g., via a backbone or similar architecture (not shown)). A simple architecture comprising one of each of the aforementioned components 102, 103, 104, 105, 106, 111 is shown in FIG. 1 for illustration, although it will be recognized that comparable architectures with multiple origination points, distribution servers, VOD servers, backbones, and/or CPE devices (as well as different network topologies) may be utilized consistent with the disclosure.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. CPE can include e.g., settop boxes, gateways, wireless access points, as well as any number of other configurations.

Content (e.g., audio, video, data, files, etc.) is provided to the client devices 106 in a given data format (e.g., MPEG-2, MPEG-4, etc.). To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

Figure 1A:
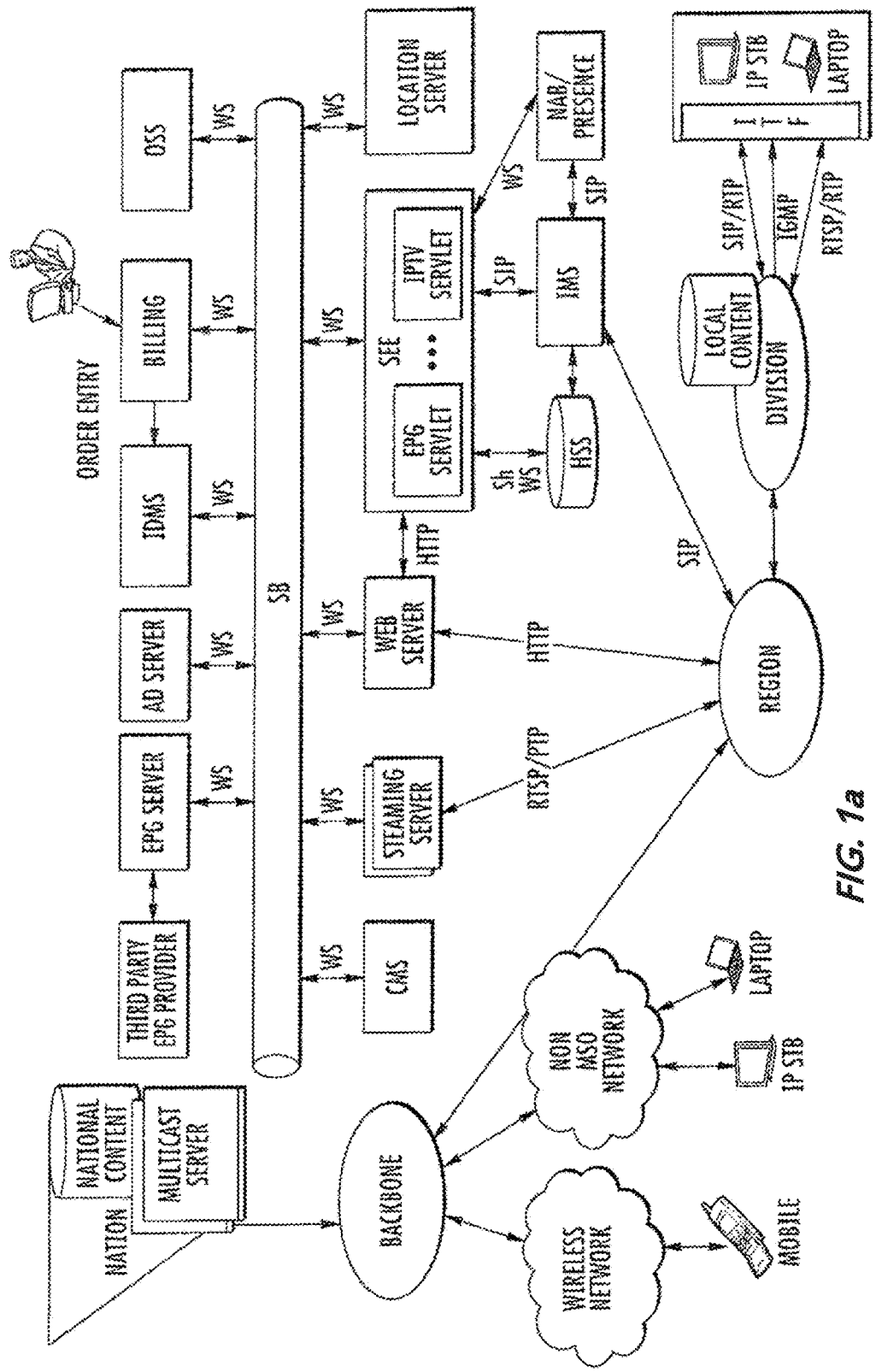
FIG. 1*a* is a functional block diagram illustrating one exemplary embodiment of a packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, IP over DOC SIS via a cable modem termination system (CMTS), etc.), they are often not optimized for such delivery. Hence, in accordance with another embodiment of the disclosure, a "packet optimized" delivery network is used for delivery of the packetized content (e.g., encoded content). FIG. 1a illustrates one exemplary implementation of such a network, in the context of a 3GPP IMS (IP Multimedia Subsystem) network with common control plane and service delivery platform (SDP), as described in co-owned U.S. patent application Ser. No. 12/764,746 filed Apr. 21, 2010 entitled "METHODS AND APPARATUS FOR PACKETIZED CONTENT DELIVERY OVER A CONTENT DELIVERY NETWORK", and issued as U.S. Pat. No. 10,264,029 on Apr. 16, 2019, which claims priority to U.S. Provisional Patent Application Ser. No. 61/256,903 filed Oct. 30, 2009, and which is now published as U.S. Patent Application Publication No. 2011/0103374, each of which is incorporated herein by reference in its entirety. As discussed therein, a substantially session-based and packetized content delivery approach (e.g., using the well-known Internet Protocol) which allows for temporal, device, and location flexibility in the delivery of the content, and transportability/migration of user sessions, as well as service/content personalization (e.g., on a per-session/user basis) and blending (integration) is provided. This approach uses a common or unified delivery architecture in providing what were heretofore heterogeneous services supplied by substantially different, and often vendor-specific, networks. Moreover, the foregoing improved apparatus and methods provide for enhanced content access, reproduction, and distribution control (via e.g., a DRM-based approach and other security and content control measures), as well as quality-of-service (QoS) guarantees which maintain high media quality and user experience, especially when compared to prior art "Internet TV" paradigms.

In another implementation, the network comprises both "managed" and "unmanaged" (or off-network) services, so that a network operator can utilize both its own and external infrastructure to provide content delivery to its subscribers in various locations and use cases. In one variant of this approach, network services are sent "over the top" of other provider's infrastructure, thereby making the service network substantially network-agnostic.

In another variant, a cooperative approach between providers is utilized, so that features or capabilities present in one provider's network (e.g., authentication of mobile devices) can be leveraged by another provider operating in cooperation therewith. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Notwithstanding the foregoing, it will be appreciated that the various aspects and functionalities of the present disclosure are effectively agnostic to the bearer network architecture or medium, and hence literally any type of delivery mechanism can be utilized consistent with the disclosure provided herein.

Illicit Activity Detection and Remediation Architecture

Figure 2:
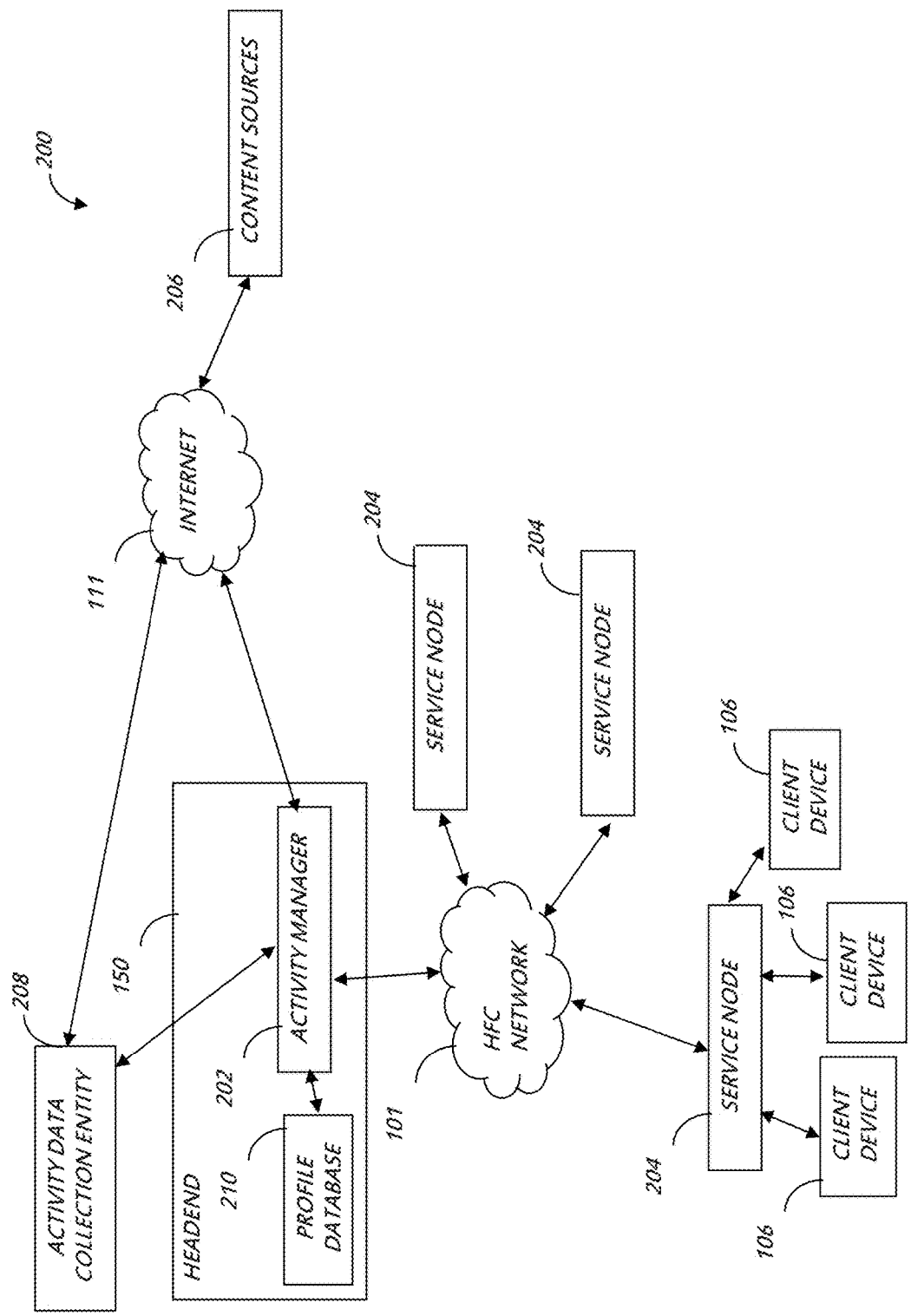
FIG. 2 is a functional block diagram illustrating an exemplary network architecture for detecting and remediating illicit online activity configured in accordance with one embodiment of the disclosure.

FIG. 2 is a block diagram illustrating an exemplary network architecture for detecting and remediating illicit online activity configured in accordance with one embodiment of the present disclosure. As illustrated, the network 200 generally comprises a plurality of client devices 106 which request and receive Internet content from content sources 206 in communication with the Internet 111. The client devices 106 access the interne via an HFC network 101. In other words, the MSO is the Internet Service Provider (ISP) for the client devices 106.

The client devices 106 of FIG. 2 are configured to communicate with various other devices including e.g., the other CPE 106, gateway devices, personal media devices (PMD), laptop computers, tablets, etc. in order to provide access to the requested content/data thereto. It will be appreciated that the term "client" in the context of the present disclosure in no way mandates a client-server or master-slave relationship; in fact, a "client device" may act as a local content server or source, as described in greater detail subsequently herein. Moreover the term "client premises device" is in no way intended to exclude mobile devices and/or devices not located within a premises.

A service node 204 is provided as an intermediary between the network headend 150 and the client devices 106 in one embodiment. A particular service node 204 services several client devices 106 in communication therewith. However, it is appreciated that the foregoing disclosure may be utilized in a system which enables direct communication between the client devices 106 and the network 101. In addition, the network 101 may be configured to provide non-Internet (e.g., broadcast, on-demand, etc.) content to the client devices 106.

As the respective users of each of the client devices 106 interacts with Internet content, data regarding the activity is collected by an activity data collection entity 208. The user's interaction may include activity which is not harmful to other devices and/or the system. Additionally, the user's interaction, whether intentionally or unintentionally, may include activity which is harmful to other devices and/or to the system. The activity data collector 208 may comprise a headend MSO-operated entity or a third-party entity in communication with the MSO-operated headend 150. In another embodiment, more than one activity data collector 208 is provided; such as one MSO-operated and one third-party operated device.

The activity data collection entity 208 generates activity records for each activity performed at the CPE 106 (or other relevant location or process within the network). In one embodiment, to generate the activity records, the activity data collection entity 208 processes the collected data by, for example, validating, analyzing, and/or normalizing the data to prepare the data for correlation with additional data such as subscriber information. For example, the activity data collection entity 208 correlates the data with subscriber information based on categories of the collected data and security profiles of the subscribers to generate the activity records, as discussed in greater detail subsequently herein.

Figure 2A:
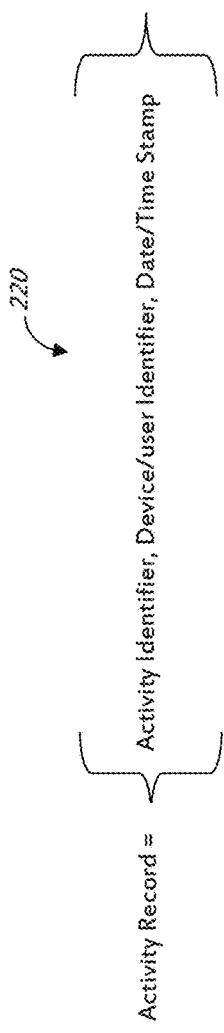
FIG. 2*a* is a graphical representation of one embodiment of an activity record for use with the present disclosure.

In one embodiment, the data records include a date and/or time stamp for the activity, an activity identifier, and a device, subscriber, or user identifier. Hence, in one embodiment, the activity data collection entity 208 is configured to, when an action is taken by the CPE 106 identify the CPE 106 (and/or a user thereof) and the type of action taken, then create a data record having an appropriate identifier of the action and a date/time stamp. An exemplary activity data record 220 is illustrated in FIG. 2a, however it is appreciated that other data formats may be utilized consistent with the present disclosure as well.

The collected activity data records 220 are then provided to the activity manager 202. In one variant, the activity data records 220 identify both the type of activity and the user (and/or device) associated with the record. For example, the data record may include a unique identifier associated with the subscriber and/or client device 106. Additionally, various shortened words or phrases may be utilized to identify particular types of activity.

The collected data, processed data, and the activity data records 220 may additionally be stored at a database located at the headend 150 (such as the profile database 210) or at a node (such as service node 204) or at a user premises. Additionally, the activity data collection entity 208 may partition the data and/or activity data records based on variable partitioning criteria such as locations of the subscribers, threat levels, customer types, service types, etc. The activity data collection entity 208 stores the partitioned data at the database along with the collected data, processed data, and the activity data records. By storing data with different levels of processing, the activity data collection entity 208 may provide data at any level of processing for reporting and analysis services.

The activity manager 202 comprises one or more applications which use the collected data to derive a "score" for each user and/or client device. The score is derived by categorizing each activity, then multiplying a value of each category of activity by a predetermined weighting factor for that type of activity. In this manner, more serious or detrimental activities more seriously impact a user's score. A total or aggregate score is then compiled for all activity of a particular device and/or user over a period of time such as via a device and/or user profile. Table 1 below is an exemplary weighting table which may be used to associate activities to specific weighting factors.

TABLE 1

| Activity | Weight |
|---|---|
| Activity A | 3.3 |
| Activity B | 2.0 |
| Activity C | −1.7 |
| Activity D | −3.2 |
| Activity E | −1.0 |

Figure 2B:
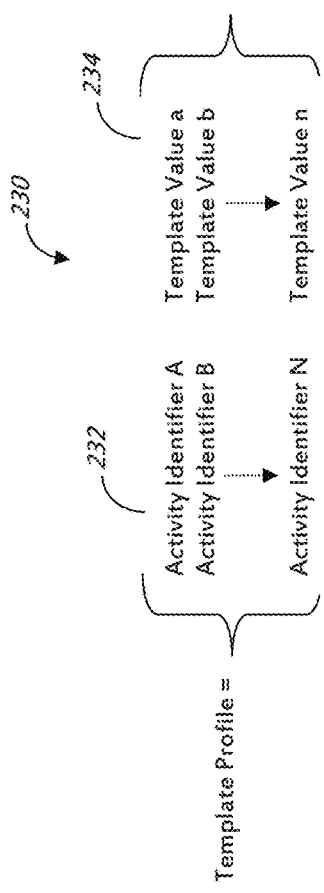
FIG. 2*b* is a graphical representation of one embodiment of a template profile for use with the present disclosure.

In one variant, each CPE 106 and/or user is assigned a template or starting profile. The starting profile is then adapted over time based on the types of activity performed by the device. An exemplary starting or template profile 230 is illustrated in FIG. 2b. As shown, the template profile 230 comprises a first column 232 which lists each activity by an activity identifier (Activity Identifiers A-N) and a second column 234 which gives a template value for each of the listed activities (Template Values a-n). The starter or template values for each activity may each be set to zero, or alternatively, certain ones of the activities may have varying, non-zero template values. In one instance, a positive and negative number valuation system may be utilized (e.g., negative activity increase the score in a negative direction while positive activity increase the score in a positive direction). Alternatively, the user and/or device may be associated to two separate score profiles, a first one indicative of negative or detrimental activity and a second indicative of positive activity.

Figure 2C:
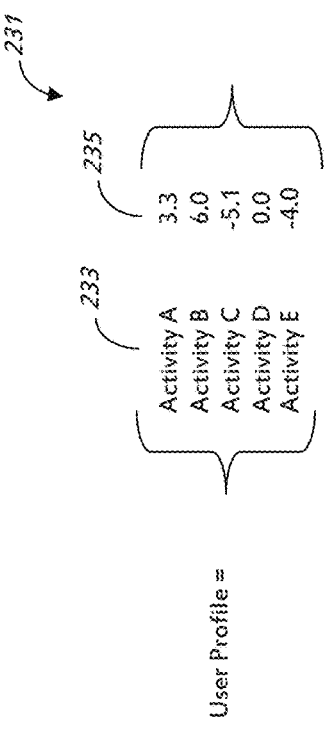
FIG. 2*c* is a graphical representation of one embodiment of a user profile for use with the present disclosure.

As noted, each CPE 106 and/or user may be assigned a single cumulative profile 231 which takes into account both positive and negative activity associated therewith as shown in FIG. 2c based off of the template profile 230 but which is adapted over time to reflect device and/or user activity. Similar to the template profile 230, the cumulative user profile 231 comprises a first column 233 listing various activities by activity identifier (Activity A-E) and a second column 235 listing a value for each of the listed activities. As shown, Activities C and E comprise activities which have a negative effect on the user profile 231, hence are illustrated as negative numbers; whereas Activities A and B are activities which have a positive effect on the user profile 231. In this manner, an MSO operator may determine an overall positive or negative score for a particular user and/or CPE 106. In the illustrated embodiment, Activity D has a current value of 0. In the instance the template value 234 for Activity D is zero, then FIG. 2c illustrates that the user and/or device 106 has not yet performed Activity D.

Hence, as the activity data records 220 are received, the activity manager 202 uses the data contained therein to access the appropriate user/device profile 231 and increment the appropriate activity 233 by an appropriate amount. The amount by which the activity is incremented is determined by the activity manager 202 via identification of the activity in a weighting table in one embodiment, see for example the values listed in Table 1 above.

In another alternative or in addition, multiple profiles similar to that of FIG. 2c may be provided such that a first profile indicates only positive activities while a second profile indicates negative activities. In this manner, an MSO operator may clearly identify the types and amounts of both positive and negative activity performed by a CPE 106 and/or user.

For example, suppose that the user profile 231 of FIG. 2c were representative of a particular user, User A. In addition, supposing that Activity D of FIG. 2c has a starting or template value of 0.0, one could reason that no activity records for Activity D have yet been received for User A. Next, suppose that the activity manager 202 receives the following data record 220:

Activity Record$_{UserA}$=(Activity D, User A, 1.13.15.9.43)

As shown, the data record indicates that Activity D was performed by User A at 9:43 am on Jan. 13, 2015. It is noted that the user identifier may be obfuscated in order to protect the identity of the user and/or device. The activity manager 202 may then determine an appropriate value by which to increment the listed 0.0 of the user profile by reviewing the aforementioned weighting table. As shown in the sample table above, Activity D has a weighting value of −3.2; hence a single record for Activity D will cause the user profile value of Activity D to change to:

1×(−3.2)=−3.2

Suppose that additional data records 220 are received as follows:

Activity Record$_{User\ A}$=(Activity A, User A, 1.13.15.9.54)

Activity Record$_{User\ A}$=(Activity A, User A, 1.13.15.13.23)

Activity Record$_{User\ A}$=(Activity C, User A, 1.13.15.18.00)

Activity Record$_{User\ A}$=(Activity E, User A, 1.13.15.21.12)

Given Table 1 above, the activity manager 202 then performs the following calculations:

Activity A=(2×3.3)+3.3=6.6+3.3=9.9

Activity C=(1×−1.7)+(−5.1)=(−1.7)+(−5.1)=−6.8

Activity E=(1×−1.0)+(−4.0)=(−1.0)+(−4.0)=−5.0

Next, the activity manager 202 updates the user profile to reflect the newly calculated data records 220 as follows:

$$\text{User A} = \begin{cases} \text{Activity A} & 9.9 \\ \text{Activity B} & 6.0 \\ \text{Activity C} & -6.8 \\ \text{Activity D} & -3.2 \\ \text{Activity E} & -5.0 \end{cases}$$

An aggregate may be taken of the individual scores across all activities, in the example above, User A's cumulative score is therefore 0.9. Alternatively, two individual scores one for positive activities and one for negative activities may be taken; in one variant this may be accomplished using dedicated positive and negative profiles. According to this variant, the aggregate may more heavily weigh the detrimental activity as compared to the positive activity to ensure that appropriate protection from illicit online activity is provided (as opposed to taking a very strict cumulative score).

The activity manager 202 may be further provided with threshold values users may not pass. When the activity manager 202 detects negative activity outside of a predetermined threshold for that activity, remediation measures are taken as will be discussed below.

The foregoing weighted scoring system may also be applied to activity which is viewed as positive or indicative of a safe user. For example, a duration of time without any negative data collected regarding a particular user or device may cause a user and/or device's score to be affected in a positive way. That is, a user/device's overall or aggregate score may be positively influenced and negatively influenced irrespective of actual records received (such as when no negative data is collected).

In one variant, the user profiles are updated periodically such that a number of activity records 220 received during a time period are saved then provided at once to the activity manager 202, which then uses them to update the user profiles as discussed above.

User/device aggregate scores are stored at a profile database 210. The scores are listed in the database by a user identity and/or a device identity, which may in one embodiment be fully anonymized to protect the subscriber's identity (such as via a one-way cryptographic hash or the like) to address, e.g., privacy concerns regarding individual user's online behavior. This anonymization also enables the ability to transport or sell the data to third parties, since there is no possible "reverse engineering" of the data or portions thereof to identify individual users or premises/accounts.

In one embodiment, the profile database 210, is located at the headend 150. Alternatively, the database 210 may be located at a service node 204 and may store data relating only to activity of the client devices 106 in communication therewith. In yet another alternative, the database 210 may be located at the client devices 106 themselves, and processed or raw data collected therefrom provide to the activity manager 202.

The activity manager 202 periodically compares each user/device profile aggregate scores to a pre-determined threshold values. The threshold value to which each score is compared may vary based on the type of subscriber. For example, a business entity subscriber may be afforded a larger aggregate score than an individual subscriber.

Additionally, the thresholds may vary based on the number of devices associated to the profile in the instance a profile represents more than one device. In the instance a profile represents only a single device, it may further be of value to identify a device among the devices associated to a subscriber as the "principal" device to which activity of the "secondary" devices is reported. In this manner, a business owner may be alerted not only to the existence of illicit activity on his/her account, but also the exact device which has committed the activity (whether knowingly or unknowingly). The business owner can then take appropriate steps to remediate the problem and/or more closely monitor the user of the device in question.

Moreover, the threshold applicable to illicit behavior may be higher or lower than a threshold applicable to positive activity. In another alternative, a single cumulative threshold value may be given for each subscriber type.

The activity manager 202 is further in communication with at various network entities which are configured to: (i) perform a remediation process when it is determined that a particular device/user has exceeded a threshold limit of permissible illicit behavior, and/or (ii) enable enhanced services when it is determined that a particular device/user has exceeded a threshold level of positive behavior.

As will be discussed in greater detail elsewhere herein, the remediation processes which may be applied to a subscriber's account in the instance a threshold limit of permissible illicit behavior is reached may include one or more of: bandwidth adjustment, disabling service, disabling certain features, and routing services for more in-depth analysis. Additionally, one or more alerts may be provided to the subscriber or user of a device when a threshold limit of permissible illicit behavior is met. In another embodiment, when the threshold limit is reached, an identity of the subscriber is requested. In one variant, this may include requesting a login identification name and/or password. When an identity of the subscriber cannot be confirmed, in addition to the remediation mechanisms discussed above, a secondary alert may be provided via the use of alternate contact information. In this manner, the system is not only able to identify that illicit behavior is associated with a third party (i.e., not the subscriber him/herself), but can further notify the subscriber of the breach and remediate the problem.

As will be discussed in greater detail elsewhere herein, the processes which are applied to a subscriber's account in the instance a particular device/user has exceeded a threshold level of positive behavior may include one or more of: bandwidth adjustment, enabling advanced services, relaxed security measures (such as identification requirements), and routing services for faster service.

Methods by which the foregoing functionality is enabled are discussed in greater detail below.

Methodology

Figure 3:
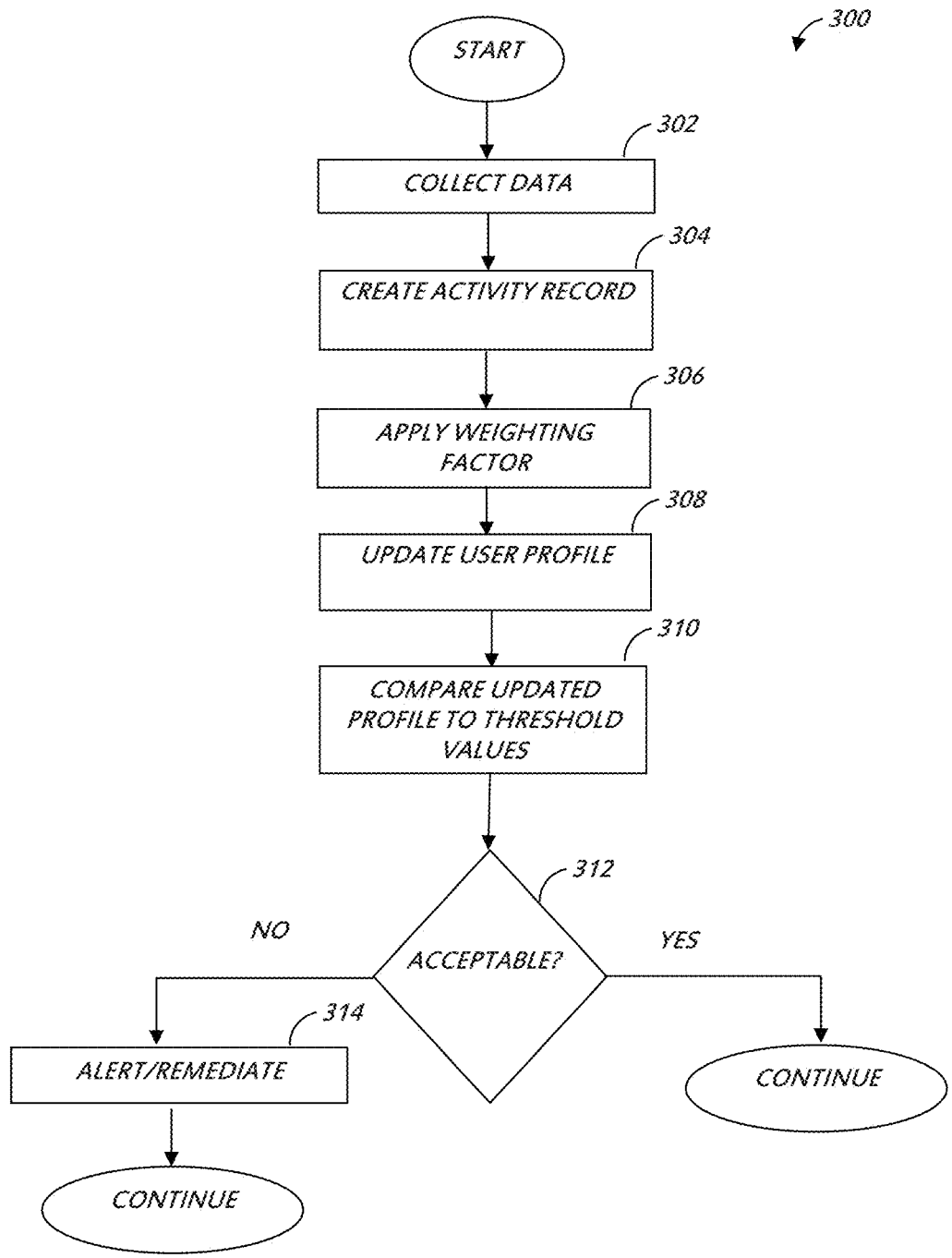
FIG. 3 is a logical flow diagram illustrating one embodiment of a method for detecting and remediating illicit online activity in accordance with one embodiment of the disclosure.

Referring now to FIG. 3, one embodiment of a method 300 for detecting and remediating illicit online activity in order to provide protection therefrom is illustrated.

As shown, per step 302, data relating to a subscriber and/or device's online activity is collected at an activity data collection entity 208. Online activity about which data is collected may include benign as well as harmful activity, including harmful activity which is intentional or unintentional. In one embodiment, the data collection entity 208 comprises a headend 150 or third party entity in communication with a headend activity manager 202.

The collected data is then used to generate a plurality of activity records 220 at step 304. In one embodiment, each activity record 220 comprises a date/time stamp, an activity identifier, and a user/device identifier (which may be obfuscated or otherwise anonymized). The data records 220 are provided from the data collection entity 208 to an activity manager 202. This may occur as a periodic push or pull, or in near-real time as the activity records 220 are generated.

Next, per step 306, the activity manager 202 applies a weighting factor to the collected data. As noted previously, different weights are applied based on the type of activity (positive or negative) and severity associated with the activity. In one embodiment, as noted previously, a pre-generated weighting table (such as that of Table 1 above) may be consulted in order to determine an appropriate weighting value to apply to an activity identified in each data record.

As is also noted above, in one exemplary embodiment, the collected data is processed into one or more user profiles. Several user profiles may also relate to one CPE 106, or user. The user profiles are, per step 308, updated based on the collected activity data. The updates may occur periodically and/or upon each instance of a positive and/or negative user activity. It is further recognized that other models may be used, such as where only certain classes of user actions, or those occurring during certain periods of time or dates, are recorded and used to update a user/device profile.

Once the user profiles are updated (based on the received activity records 220), the updated profiles are compared to pre-determined threshold values at step 310. The threshold values may apply to an aggregate score for both illicit and benign activity, or may comprise a value for each of these types of activities individually. The aggregate score may be compiled using the here described aggregate profile, or using multiple profiles representative of positive and negative behavior to which second weighting factors are applied. In other words, weighting factors are applied to each negative activity within a negative profile and an aggregate negative value is reached; this value is then further weighted and combined with a similar value for positive activity (i.e., weighting factors are applied to each positive activity within a positive profile and an aggregate positive value is reached, weighted, and combined with the negative value determined above).

When the comparison indicates that a user profile value is acceptable, step 312, the method continues. That is, when the updated user profile value is within the network operator determined threshold levels, the user/device may continue performing requested activities (and data records 220 will continue to be generated). Additionally, the processes discussed in FIG. 3b below may be implemented. When the comparison indicates that a user profile value is not acceptable (step 312), then per step 314, steps are taken to alert the user or subscriber and/or remediate the problem, as discussed below with respect to FIG. 3a.

In one embodiment, the report or alert which is sent to the user/device discloses the profile value as well as other information which may be determined from the activity data. For example, the user/device may be alerted as to the dates and times of suspicious activity. In this manner, the user or subscriber may take necessary steps to remediate illicit online behavior. In addition, the user/device may be given precise information as to the types of activities which have occurred (i.e., their system has been hijacked by a spambot, etc.). Moreover, the user or subscriber may benefit from periodic updates regarding their current status.

It is further noted that the foregoing comparison step (step 312) may be performed at instances where the user requests to perform an action. When the threshold values of the profile are acceptable, the requested user action is permitted; and when the threshold values of the profile are not acceptable, the requested user action is not permitted and remediation (as discussed elsewhere herein) occurs.

Figure 3A:
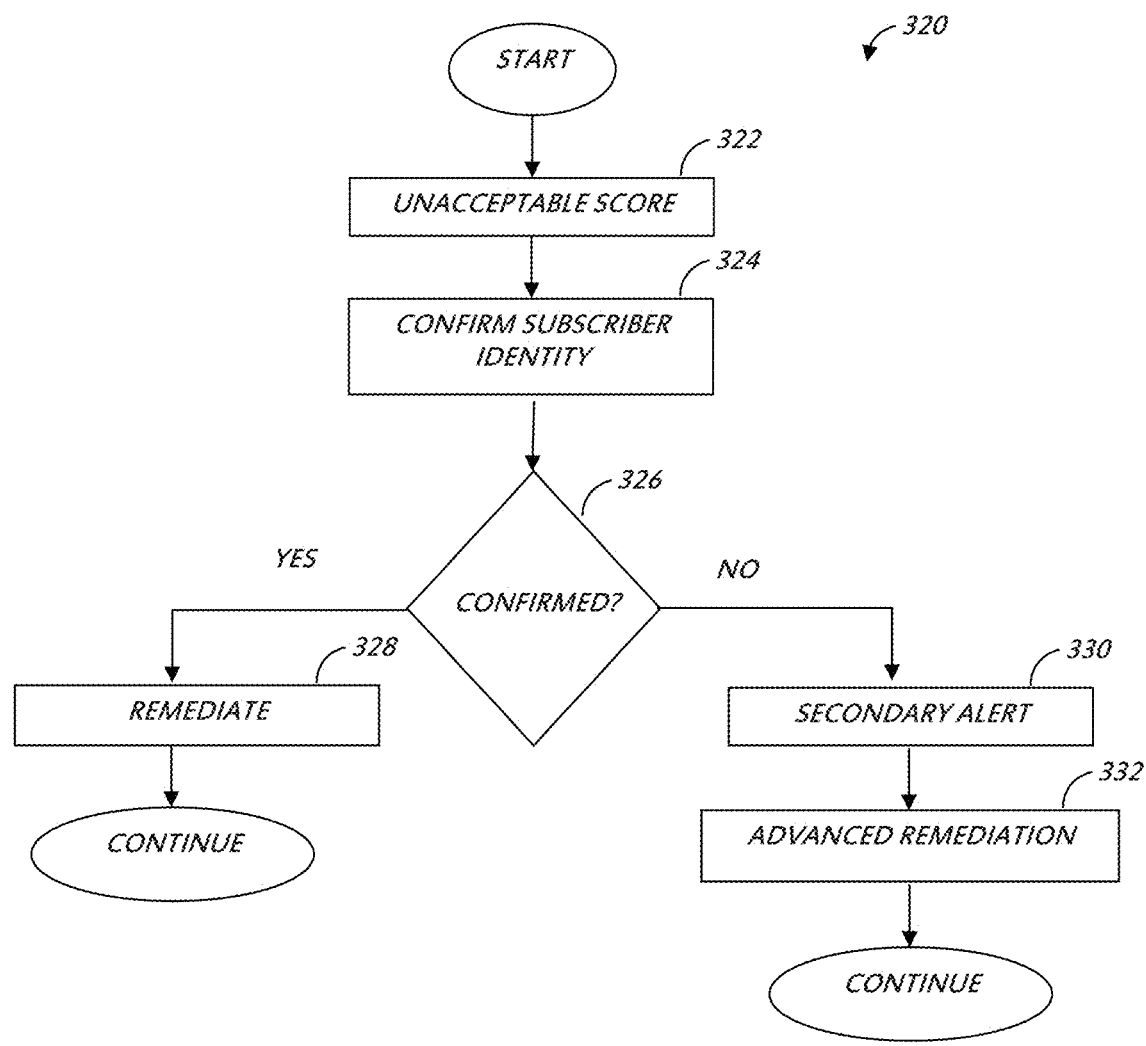
FIG. 3*a* is a logical flow diagram illustrating one embodiment of a method for proceeding when an abundance of illicit online activity is detected in accordance with one embodiment of the disclosure.

Referring now to FIG. 3a, an exemplary method 320 for proceeding when an excess of illicit online activity is detected in accordance with one embodiment of the disclosure is shown. At step 322, it is determined that a particular user or device profile has an unacceptable score. In one exemplary embodiment, the user/device profile may comprise a profile which indicates only illicit activity performed by the device or user. The aggregate score of the illicit activity profile is compared to a threshold value (as discussed above), and it is determined that the score is outside the acceptable range. In another exemplary embodiment, the user/device profile comprises a profile which includes both positive and negative user/device activity and the overall score when compared to a threshold value indicates an excess of illicit activity.

Upon determination that the user/device has performed illicit activity in excess of an MSO determined threshold, at step 324 the subscriber's identity is confirmed. The subscriber's identity may be confirmed via a number of mechanisms. For example, the MSO may require a subscriber identity and password combination, entry of personal identification information, responses to "secret" questions, etc. The foregoing mechanisms enable an operator at the MSO to verify that any activity occurring at that device or alleged to be performed by that user are verifiably being performed by the subscriber in question.

When the subscriber's identity is confirmed (step 326), appropriate remediation procedures are implemented at step 328. Exemplary remediation measures include adjustment of bandwidth available to the subscriber. An amount of bandwidth which is taken away and/or remains available for use may be determined based on a number of factors including, the weight or severity of the subscriber's illicit activity, the frequency of illicit activity, the duration of time since the most recent illicit activity incident was reported, etc. Other remediation processes may include disabling service or disabling certain features for a given period of time and/or indefinitely based on the severity and frequency of the illicit activity. In addition, the MSO may determine that certain patterns of illicit activity and/or types of activity warrant closer inspection. Accordingly, services for a particular subscriber and/or device may be routed to a headend evaluation entity. An MSO operator or other entity may then more closely monitor activity of subscriber and/or device for a period of time and determine further measures which should be taken accordingly (such as disabling service, sending notifications, etc.).

It is appreciated that more than one of the remediation procedures discussed above may be applied simultaneously. Moreover, the foregoing patterns of behavior, frequency, duration, and time periods may be determined via an examination of date/timestamps within the activity data records 220 discussed elsewhere herein.

When the subscriber's identity is not confirmed (step 326), secondary alerts are provided at step 330. That is, because it cannot be confirmed that the user of a device is a subscriber of the network, alternative means of contacting the appropriate subscriber are used. For example, secondary email addresses, contact telephone numbers, etc. are used to notify the subscriber of the illicit activity occurring on the device associated with that subscriber account. The aforementioned remediation processes as well as advanced remediation processes may then be implemented (step 332). Advanced remediation processes include strict denial of service, however, any of the foregoing remediation steps (such as those of step 328) may be performed as well.

Figure 3B:
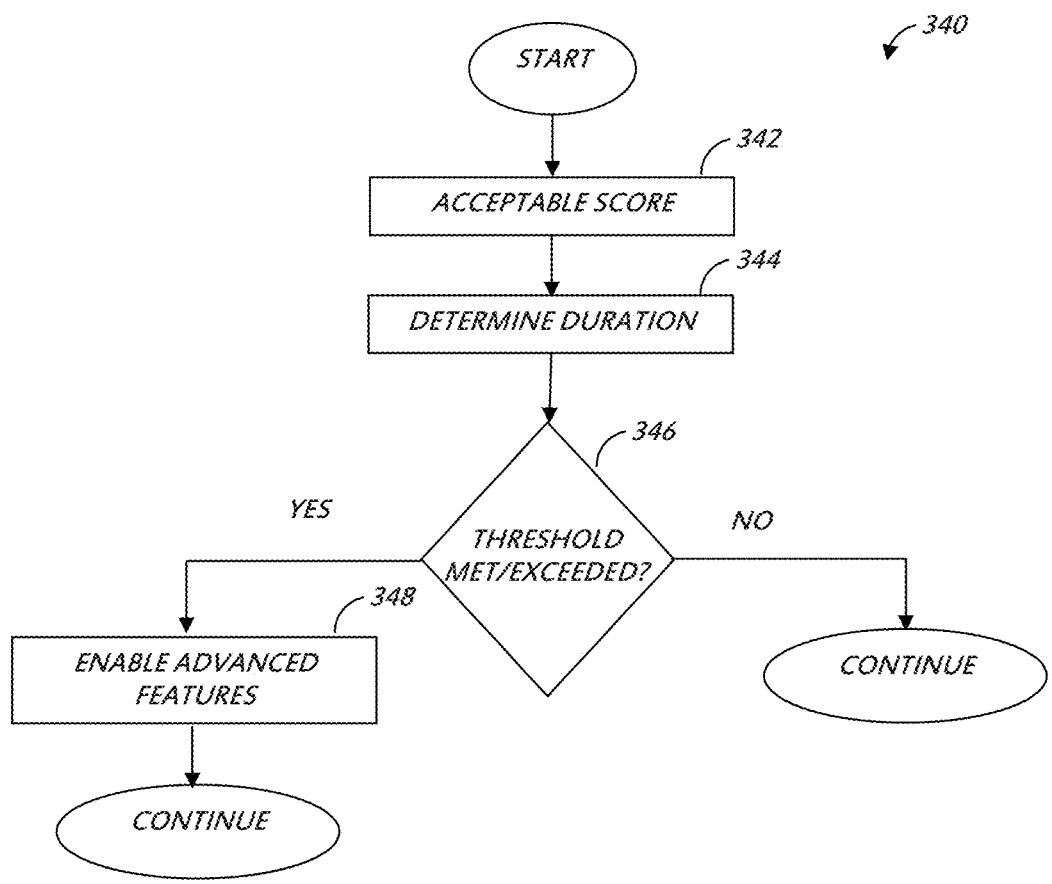
FIG. 3*b* is a logical flow diagram illustrating one embodiment of a method for proceeding when an abundance of illicit online activity is not detected in accordance with one embodiment of the disclosure.

Referring now to FIG. 3b one embodiment of a method for proceeding when an abundance of positive online activity is detected is illustrated. As shown, per step 342 an acceptable profile score is identified. For example, an aggregate profile score or positive profile score meets or exceeds an MSO determined threshold value for positive activity. Next, the duration during which the subscriber and/or device has held an acceptable score is determined (step 344). As noted previously, this may be accomplished by reviewing the user/device profile and/or by reviewing a date/timestamp of a most recent record of illicit activity.

The determined duration is then evaluated at step 346 to illicit whether a threshold therefor is met and/or exceeded. In one embodiment, the threshold duration is determined and provided by an operator at the MSO. Additionally, the MSO operator may determine whether the threshold value must merely be met, or whether it must be exceeded at step 346.

When the threshold is met and/or exceeded, advanced features are enabled at step 348. For example, a greater amount of bandwidth may be provided to those users/devices which have exhibited safe online practices for the required duration. In another variant, such bandwidth increases may be tiered based on the duration of positive activity. In this manner, users/devices which have exhibited positive behavior longest will be afforded the most bandwidth. In another example, advanced services may be provided to only those users/devices which satisfy the safe use policy or threshold.

In addition, relaxed security measures may be implemented in the instance a user/device has met and/or exceeded the threshold value. For instance, the user/device may be subjected to fewer interruptions to request password, personal identification, etc. and instead, the user/device's authentication is extended automatically.

In yet another example, the advanced features enabled at step 348 may include actively routing services for the users/devices which have met and/or exceeded the threshold duration for acceptable activity to ensure faster service thereto. According to this embodiment, the MSO actively monitors various network pathways to determine speed of possible service. With this information, one or more levels of service speed may be created and provided to users/devices such as based on the duration during which each has exhibited only positive behavior. In other words, users/devices which have shown a longer duration of positive online activity so as to meet and/or exceed the threshold (step 346) will be given access to the highest speeds available.

In the instance that a user/device has not met and/or exceeded the threshold duration listed in step 346, the method continues and additional data is gathered and evaluated.

Activity Manager

Figure 4:
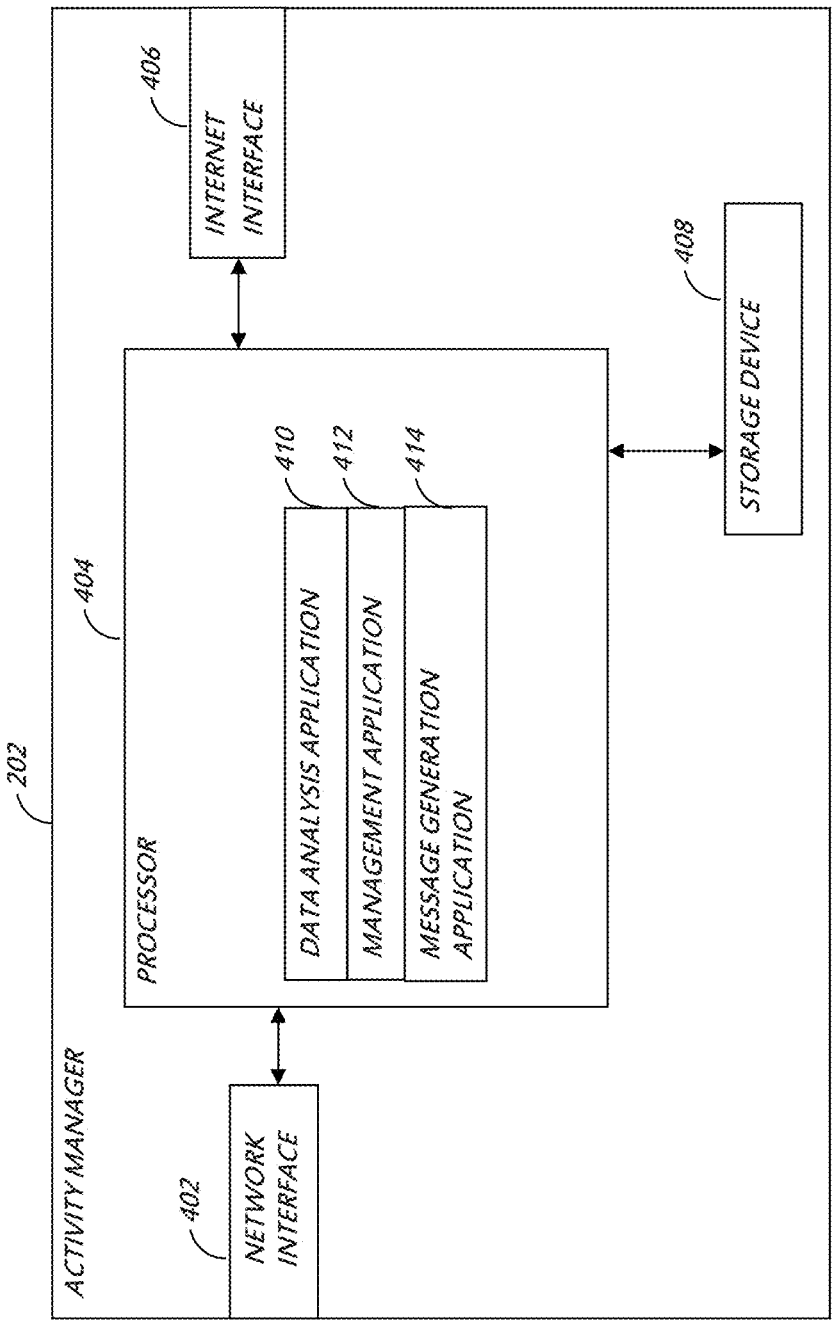
FIG. 4 is a functional block diagram illustrating an exemplary activity manager for use in the present disclosure.

Referring now to FIG. 4, one exemplary embodiment of an activity manager entity 202 is illustrated. As shown, the activity manager 202 in this embodiment comprises a network interface 402, a processor 404, a storage device 408, and an Internet interface 406. In the illustrated embodiment, the activity manager is implemented on one or more servers (which may be geographically localized, such as in a server "farm", or alternatively distributed across multiple geographic regions).

The network interface 402 enables two way communication between the activity manager 202 and other portions of the managed (MSO) network 101 and other network entities (such as e.g., the activity data collection entity 208 and the profile database 210). The Internet interface 406 enables two way communication with other entities including e.g., content sources 206 via the Internet 111. The activity manager 202 itself may be located at a network headend 150 (see FIG. 2), another portion of the MSO network 101, or alternatively at a non-MSO network (not shown). Accordingly, the network interface 402 may be utilized for communication therewith.

The activity manager 202, as noted above, further comprises a digital processor 404, which, in one embodiment, is configured to run one or more computer programs (stored at the storage apparatus 408), including a data analysis application 410, a management application 412, and a message generation application 414. It is further noted that the functionality of the foregoing applications may be accomplished via any number of discrete applications run on across any number of entities whether located at the headend 150 or in communication therewith.

The data analysis application 410 comprises a plurality of instructions which, when executed by the processor 404, cause the activity manager 202 to analyze data collected via the network interface 402. The raw data records 220 relating to online activities of the client devices 106 are received from the data collection entity 208. This may occur as a periodic push or pull, or in near-real time as the activity records 220 are generated. The analysis of the data comprises derivation of a "score" for each user and/or client device. In one embodiment, this is accomplished via the data analysis application 410 generating a profile for each CPE 106 and/or user. In one variant, the profiles are derived using a template or starting profile which is adapted over time based on the types of activity performed by the device. Each CPE 106 and/or user may be assigned a single cumulative profile which takes into account both positive and negative activity associated therewith (see FIG. 2c). Alternatively or in addition, multiple profiles similar to that of FIG. 2c may be provided such that a first profile indicates only positive activities while a second profile indicates negative activities. Accordingly, as the activity data records 220 are received, the data analysis application 410 uses the data contained therein to access the appropriate user/device profile and increment the appropriate activity by an amount. The amount by which the activity is incremented is determined via the data analysis application 410 consulting a weighting table (see e.g., that of Table 1 above).

The management application 412 comprises a plurality of instructions which when executed by the processor 404 cause the activity manager 202 to manage a plurality of threshold values and compare the profiles thereto. In other words, the management application 412 periodically compares each user/device profile aggregate scores to a predetermined threshold values. For example, the management application 412 determines whether a client device and/or user's negative activity is outside of a predetermined threshold for that activity. In this instance, remediation measures are taken as discussed elsewhere herein. The threshold value to which each score is compared may vary based on the type of subscriber.

The message generation application 414 comprises a plurality of instructions which when executed by the processor 404 cause the activity manager 202 to communicate to the various network entities one or more messages relating to a status of the client devices and/or users. Specifically, the message generation application 414 generates messages to the various network entities which are configured to: (i) perform a remediation process when it is determined that a particular device/user has exceeded a threshold limit of permissible illicit behavior, and/or (ii) enable enhanced services when it is determined that a particular device/user has exceeded a threshold level of positive behavior. Additional messages are also generated by the message generation application 414.

Activity Data Collection Entity

Figure 5:
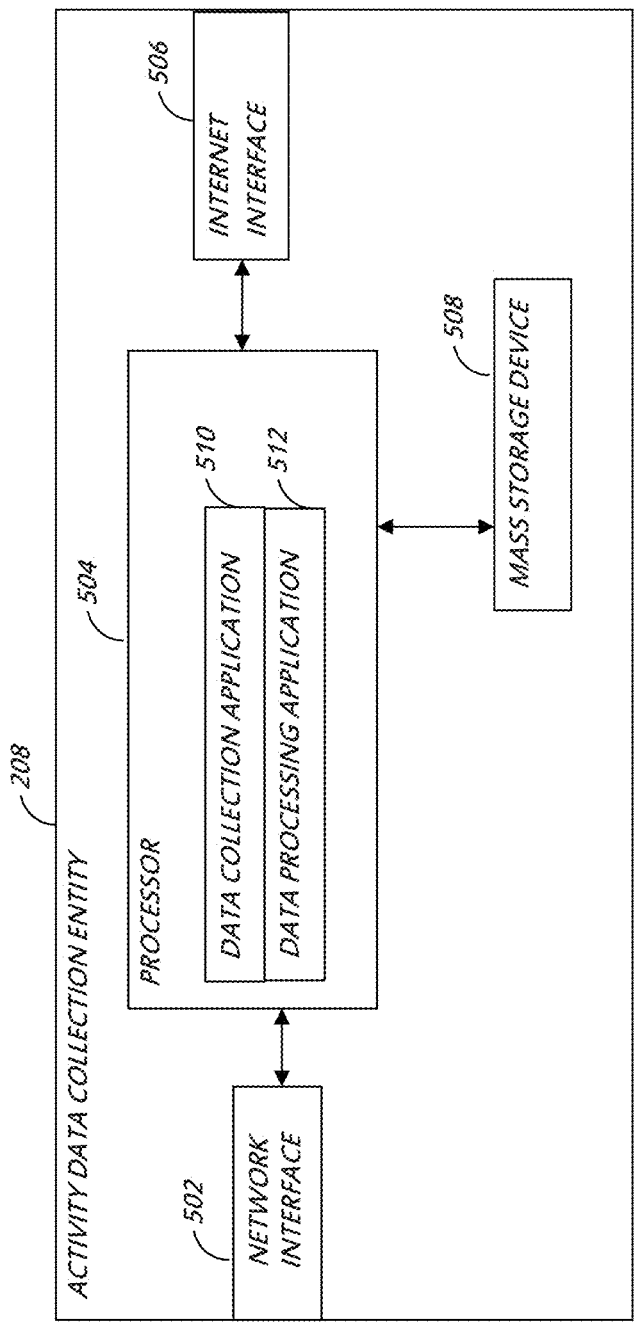
FIG. 5 is a functional block diagram illustrating an exemplary activity data collection entity for use in the present disclosure.

FIG. 5 illustrates one exemplary embodiment of an activity data collection entity 208 useful with the present disclosure. As shown, the activity data collection entity 208 generally comprises a network interface 502 for interfacing with other entities of the content delivery network 101 and/or the managed network headend 150, a processor 504, a storage apparatus 508, and an Internet interface 506. In the illustrated embodiment, the collection entity is implemented on one or more servers (which may be geographically localized, such as in a server "farm", or alternatively distributed across multiple geographic regions), and may also be physically and/or logically integrated with the aforementioned activity manager 202.

In the illustrated implementation, the server functionality is based on an exemplary Microsoft® SQL Server® Enterprise suite, although it will be appreciated that other configurations may be used consistent with the present disclosure. The exemplary SQL Server Enterprise suite provides, inter alia, high levels of speed/performance, encryption, local and "cloud" database access, and policy-based management. Specifically, SQL Server Reporting Services (SSRS) and SQL Server Analysis Services (SSAS) are two salient features of SQL Server that enable the exemplary SQL Server to provide the desired functionality in the exemplary embodiments, as well as enhanced data partitioning functionality, and so-called "Dimension" and "Fact" table management.

As is well known, data warehouses are typically built using dimensional data models which include fact and dimension tables. Dimension tables are used to describe dimensions; they contain e.g., dimension keys, values and attributes. As but one example, an exemplary "time" dimension might contain chronological increments or references (e.g., hour, day, month, etc.). An exemplary product or service dimension could contain a name and description of products or services the MSO provides, their incremental price, and other attributes as applicable.

Dimension tables are often small; however, in the exemplary embodiment described herein, the dimension tables may grow to literally millions of entries or rows; e.g., one for each subscriber, CPE, and/or account, etc.

Data warehouses may have multiple time dimensions as well. Since the warehouse may be used for finding and examining trends, it is often important to understand when each event has occurred; e.g., prior infections of subscriber computers, prior contact of a CSR, visitations to certain domains or websites, etc. A common time dimension is calendar time.

Fact tables may contain e.g., keys to dimension tables, as well as measurable facts useful to implementing the various algorithms described herein. For example, in one embodiment, the MSO might maintain a fact table recording provision of a service or data "product" to a given subscriber, or records of the subscribers use of their DOCSIS modem to access certain proscribed Internet websites.

Similar to data warehouses, such fact tables can grow very large, with millions or even billions of rows in the exemplary context of a nationwide MSO with millions of subscribers. This underscores some of the advantageous aspects of the present disclosure; i.e., efficient accumulation, storage, management, and utilization of possibly hundreds or thousands of entries (e.g., events) for millions of subscribers is not only arduous, but effectively impossible using any manual processes, especially if the analysis and corrective action is to be implemented in a timely fashion (i.e., such that infections, distribution of malware, etc. are "nipped in the bud").

It will be appreciated from the foregoing that various levels of "granularity" may be used in constructing the aforementioned data structures, depending on factors such as (i) availability of data (e.g., data may only be available in certain time increments, certain performance variables, etc.); (ii) desired frequency of review or analysis; (iii) desired end result or subscriber metrics, etc. Thus, the present disclosure contemplates using the aforementioned data structures both at varying levels of granularity, and dynamically (i.e., granularity in a given area potentially be modified, or alternating between levels of granularity based on e.g., occurrence of certain events such as a subscriber infection).

The activity data collector 208 may comprise a headend MSO-operated entity or a third-party entity in communication with the MSO-operated headend 150. In another embodiment, more than one activity data collector 208 is provided; such as one MSO-operated and one third-party operated device.

The network interface 502 enables two way communication between the activity data collection entity 208 and the HFC network 101 and other network entities (such as e.g., the activity manager 202 and the profile database 210). The Internet interface 506 enables two way communication with other entities including e.g., content sources 206 via the Internet 111. The activity data collection entity 208 itself may be located at a network headend 150 (see FIG. 2), another portion of the MSO network 101, or alternatively at a non-MSO network (not shown). Accordingly, the network interface 502 may be utilized for communication therewith.

The activity data collection entity 208, as noted above, further comprises a digital processor 504, which, in one embodiment, is configured to run one or more computer programs (which may be stored in memory in data communication with the processor, or at the storage apparatus 508), including a data collection application 510 and a data processing application 512. It is further noted that the functionality of the foregoing applications may be accomplished via any number of discrete applications run on across any number of entities whether located at the headend 150, or located elsewhere and in communication therewith. The collection and processing applications operate collectively to implement a data architecture (see FIG. 5a), discussed in greater detail below.

Figure 5A:
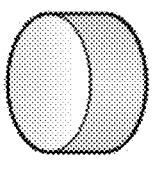
FIG. 5*a* is a functional block diagram illustrating an exemplary data architecture for use in the present disclosure.

The data collection application 510 comprises a plurality of instructions which when executed by the processor 504 cause the activity data collection entity 208 to collect data regarding the activity of respective users of each of the client devices 106 with Internet content. The activity data collection entity 208 collects data from various sources for subsequent use within the data architecture (FIG. 5a, discussed below). For example, the data collection entity collects data for sources such as (i) open content sources accessible via or connected to the Internet, (ii) email services, (iii) output of MSO customer care tools, (iv) third party data sources. Exemplary third party or other sources may include, for instance: Damballa, Shadowserver Foundation, or ACT (proprietary Automated Copyright Tool of the Assignee hereof).

The data collection application 510 may be implemented using suitable push/pull technologies, e.g., Microsoft.net technologies, for collecting data from data sources. The collected data is stored in the storage device 508 in raw format. As noted elsewhere herein, the user's interaction may include activity which is not harmful to other devices and/or the system. Additionally, the user's interaction, whether intentionally or unintentionally, may include activity which is harmful to other devices and/or to the system.

The data processing application 512 comprises one or more computer programs with a plurality of instructions which when executed by the processor 504, cause the activity data collection entity 208 to process the collected data and generate activity records for each activity performed at the CPE 106, or other data output as described further below. The data processing application 512 may utilize as part of its operation a database engine (such as the aforementioned Microsoft SQL Server or similar technology). In one implementation, the application computer program is rendered in a C# ("C Sharp") object-oriented programming language (C# was chosen in the exemplary embodiment for use of the .NET Framework, which provides large libraries with built in capabilities and methods useful in the context of the present disclosure), although it will be appreciated that other languages may be used consistent with the present disclosure. The activity data collection entity 208 processes the collected data by, for example, validating, analyzing, and/or normalizing the collected data to generate a database of user and activity information. The activity data collection entity 208 normalizes the data by, for example, extracting information from the data and organizing the extracted information into a predefined format. The extracted information may include e.g., a user identifier, an activity identifier, and a data and time stamp for the activity. Processing the collected data prepares the data for correlation with other additional data, such as subscriber information obtained from the MSO network. The activity data collection entity 208 stores the processed data in a mass storage device; e.g., the local storage device 508 shown in FIG. 5, or alternatively cloud storage.

Figure 7:
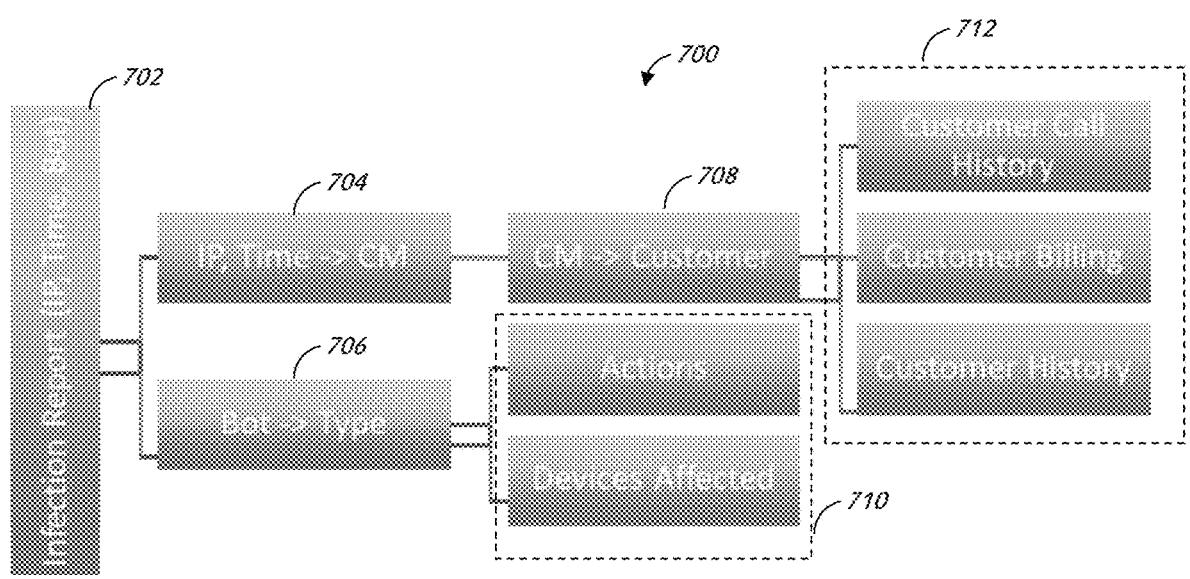
FIG. 7 is a logical block diagram illustrating one embodiment of a method of data enrichment according to the disclosure.

In one implementation, the activity data collection entity 208 looks up individual subscriber information from the service provider's database, and correlates the processed (ingested) data with the accessed subscriber information based on, for example, categorization of the processed data and security profiles of the subscriber. For instance, the ingested data may include one or more signatures or profiles indicative of certain types of undesired behavior (e.g., accessing risky or blacklisted websites, failure to utilize certain protective measures such as anti-virus software, failure to enable a firewall, etc.). FIG. 7 (discussed below) illustrates one exemplary "enrichment" process for ingested data to, inter alia, enable more meaningful analysis and resulting actions.

Activity of the selected subscriber that correlates to any such profiles is ostensibly indicative of the user's "risk" or propensity for future infections, security breaches or the like, and hence is a significant determinant in how that subscriber will be managed going forward. In one embodiment, the data records include a date and/or time stamp for the activity, an activity identifier, and a device, subscriber, or user identifier. Hence, in one embodiment, the data processing application 512 is configured to, when an action is taken by the CPE 106 identify the CPE 106 (and/or a user thereof) and the type of action taken, then create a data record having an appropriate identifier of the action and a date/time stamp.

The data records 220 are provided from the data collection entity 208 to an activity manager 202 in one embodiment via the network interface 502. This may occur as a periodic push or pull, or in near-real time as the activity records 220 are generated.

In one embodiment, the activity data collection entity 208 processes the foregoing correlation (activity) records to generate an aggregated database that can be partitioned based on any number of different partitioning criteria, such as geographic locations of subscribers, threat levels, customer types, service types, etc. The activity data collection entity 208 stores the partitioned data in the local mass storage device 508, or other storage such as cloud storage so as to make the data available to multiple disparate entities which may have need for it, such as customer care centers or CSRs.

The partitioned data is configured to facilitate manageability and availability of the data. For example, a service provider (e.g., CSR of the MSO) may query the partitioned data based on one or more criteria (e.g., for a specific subscriber, such as by account number), and utilize the data in terms of subscriber management going forward. Moreover, the database may be queried for other purposes, such as to perform statistical or other analysis on the retrieved data to determine, for example, a percentage of subscribers in a zip code affected by a particular security threat. The service provider may use such information to provide customize services for the subscribers in that area (either individually, or as a whole). For example, a service provider may customize phone trees and interactive voice response (IVR) systems based on the statistical information derived from the partitioned database to create an efficient approach for handling customer service inquiries so as to e.g., mitigate or pre-empt future undesired behavior from a subscriber or group of subscribers.

FIG. 5a illustrates one embodiment of an exemplary data architecture 520 useful with the present disclosure. The storage device 508 of FIG. 5 may be used to contain all or portions of data associated with the architecture 520 (e.g., on a single unitary storage device), or such data can be distributed across multiple storage components, whether physically localized or disparate (including e.g., cloud storage). The data stored in the data architecture is logically organized into four different functional layers: (i) a "raw" data layer, (ii) a data transformation layer, (iii) an analytics layer, and (iv) a distribution layer. In the illustrated implementation of FIG. 5a, these layers are correspondingly referred to as the "Load" layer, the "Transform" layer, the "Correlation" layer, and the "Mart" layer.

One attribute of the illustrated architecture 520 is the accessibility of each of the discrete "layers" by e.g., a querying entity. Specifically, "raw" data ingested from the various data sources is stored, and accessible (with appropriate permissions) in that form. Likewise, after pre-processing (e.g., normalization, formatting, etc. at the data transformation layer), such pre-processed data is available to querying entities. Similar logic applies to the analytics layer and the distribution layer. This capability enhances the utility of the database, in that data can be accessed at these discrete points during its processing, such as for use in alternate types of analyses, as a product to be distributed to one or more third parties, etc. The data can also propagate down through the layers of the data architecture 520 sequentially, with the distribution or "mart" layer (discussed) below being the repository for the finally processed data (at least within the illustrated architecture).

In the illustrated embodiment of FIG. 5a, the Load layer contains data collected from data sources (e.g., Source A, Source B, Source C, to Source N+) in raw format. The collected data includes, inter alia, user information and activity information pushed or pulled from the data sources. The data sources include third-party data sources and the service provider's internal data sources. For example, user and activity information may be collected from third-party content providers, third-party email service providers, customer care tools, etc. As illustrated, the collected data at this layer is organized by the data source that provided the data.

The Transform layer contains collected data that has been pre-processed; e.g., into data sets (e.g., Data Set A, Data Set B, to Data Set N+). The processing of the collected data may include one or more of validation (e.g., does the data meet certain criteria as to type, constituency, etc.), filtration (e.g., elimination of inappropriate or other undesired data), normalization (e.g., formatting into a common format or scheme to enable subsequent manipulation), and/or extraction (e.g., to extract and organize information from the collected data into data sets). For instance, in one embodiment, the aforementioned Transform layer would include "cleansed" source data from the Load layer, such cleansing including e.g., deduplication, non-MSO owned IP addresses segregated, and elimination of formatting issues or inconsistencies.

The Correlation layer contains processed data that has been correlated with subscriber information (e.g., using the aforementioned applications of the data collection entity) and organized into useful data sets. For instance, one organizational scheme comprises organization by subscriber (or accounts associated with the subscriber) into subscriber data sets (e.g., Subscriber Data Set A, Subscriber Data Set B, to Subscriber Data Set N+). A subscriber data set may contain for example the activity records for the corresponding subscriber (and/or account). In one embodiment, the activity records include a date and/or time stamp for the activity, an activity identifier, and a device, subscriber, or user identifier. It will also be appreciated that individual accounts may have multiple different users, each of which may use a different client device associated with the account, and/or may have different levels and types of activity online (e.g., "profiles"). Hence, to be effective, the network operator may need to distinguish between such individual users associated with a single account, including in the processing and organization of the correlated data.

The exemplary "Mart" layer contains subscriber data that has been partitioned based on one or more variable partitioning criteria, such as locations of subscribers, threat levels, customer types, service types, etc. Various data "products" can be obtained from this layer by e.g., MSO personnel or third-party users (such as advertisers who are placing ads within the MSO network).

Figure 6:
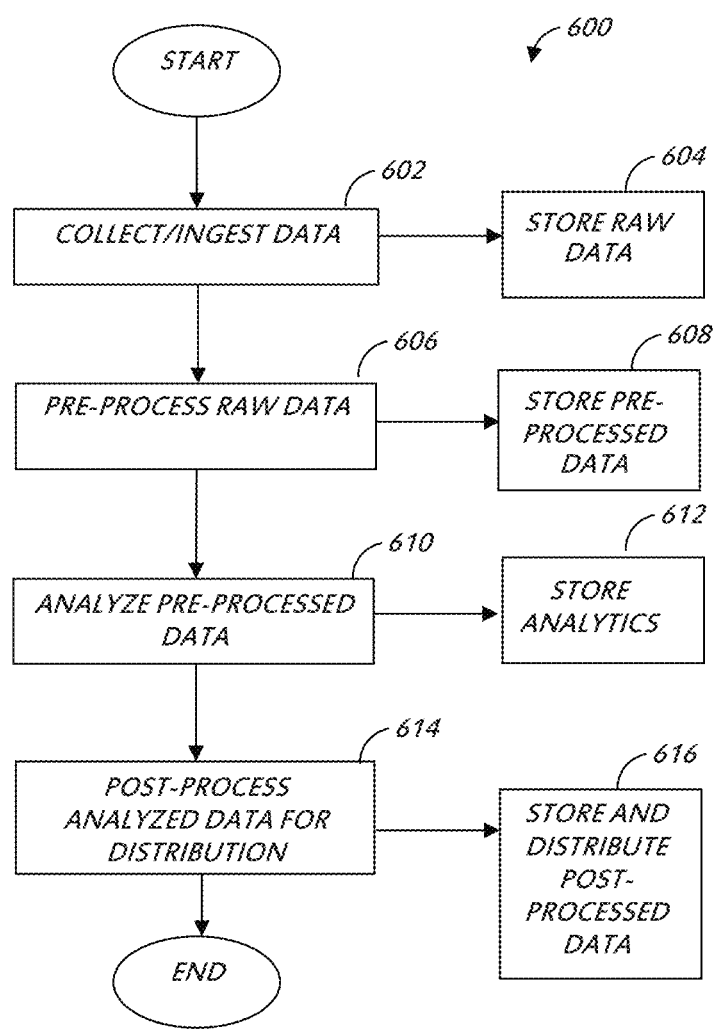
FIG. 6 is a logical flow diagram illustrating one embodiment of a method for collecting, processing, and storing data relating to online activity in accordance with one embodiment of the disclosure.

Referring now to FIG. 6, one embodiment of a method 600 for collecting, processing, and storing data relating to online activity is illustrated.

As shown, per step 602, data is collected or ingested from different data sources. The data sources include third-party data sources and/or the service provider's internal data sources (e.g., MSO analytics relating to Internet activity, consumed bandwidth, and the like). The collected data includes, inter alia, user information and activity information pushed or pulled from the data sources. For example, user and activity information may be collected from third-party content providers or warehouses, third-party email service providers, customer care tools, etc.

At step 604, the collected data is stored in raw format. The collected data is organized in the storage repository, such as by the data source that provided the data.

Per step 606, the collected raw data is transformed into data sets by pre-processing the raw data. The pre-processing may be performed on the raw data collected from the data sources (directly), or on the collected raw data stored per step 604. The pre-processing of the raw data includes e.g., validating, filtering, extracting, and/or normalizing the raw data as previously described. The pre-processed data sets are stored at step 608.

Per step 610, the pre-processed (transformed) data is analyzed to identify useful relationships or metrics. In the exemplary embodiment, this analysis comprises correlation of the transformed data with network subscriber information. The correlating may be performed on the transformed data before, during, or after the storage of the transformed data per step 608. The transformed data is also organized by subscriber into subscriber data sets. A subscriber data set may contain for example the activity records for the corresponding subscriber. In one embodiment, the activity records include a date and/or time stamp for the activity, an activity identifier, and a device, subscriber, or user identifier. The subscriber data sets are stored per step 612.

Per step 614, the subscriber data is post-processed (e.g., partitioned) based on variable criteria. Such criteria may relate for example to geographic or network locations of subscribers, threat levels or types, customer types, service types (e.g., service level provided to the user within the MSO network), etc. The partitioning may be performed on the subscriber data before, during, or after the storage of the subscriber data per step 612. The partitioned data is stored per step 616.

Figure 6A:
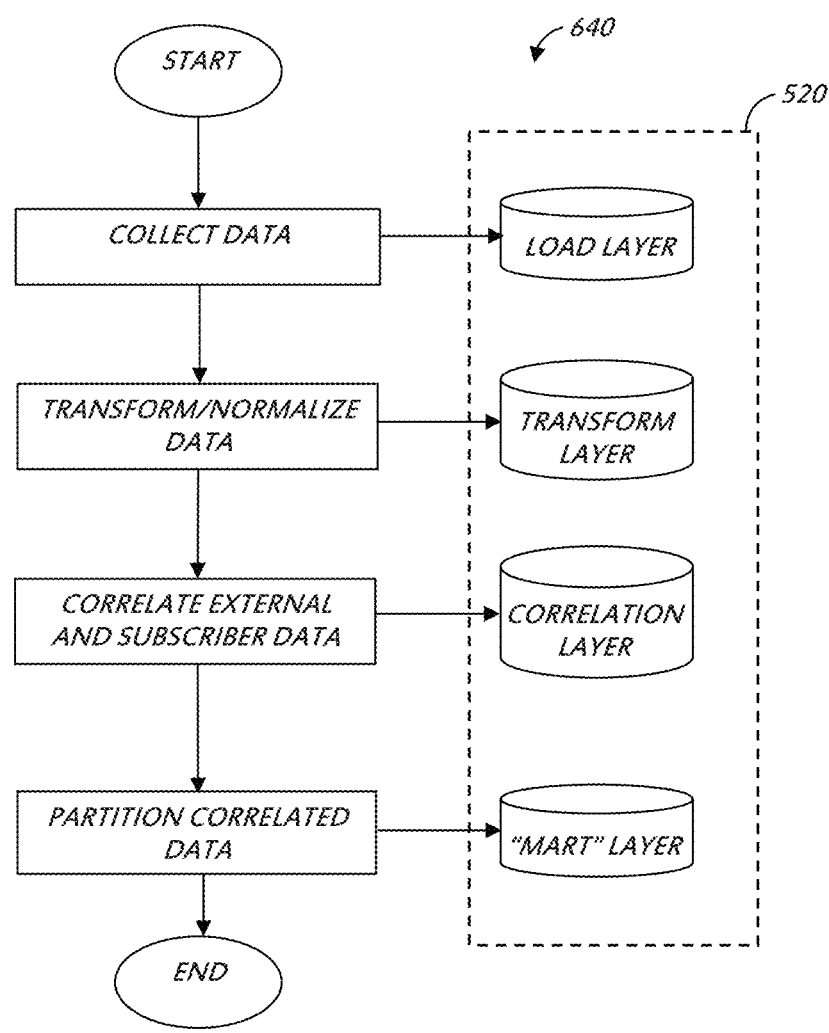
FIG. 6*a* is a logical flow diagram illustrating one particular implementation of the method of FIG. 6, in the context of a multi-layer data architecture for use in a multi-subscriber service provider network.
Figure 6B:
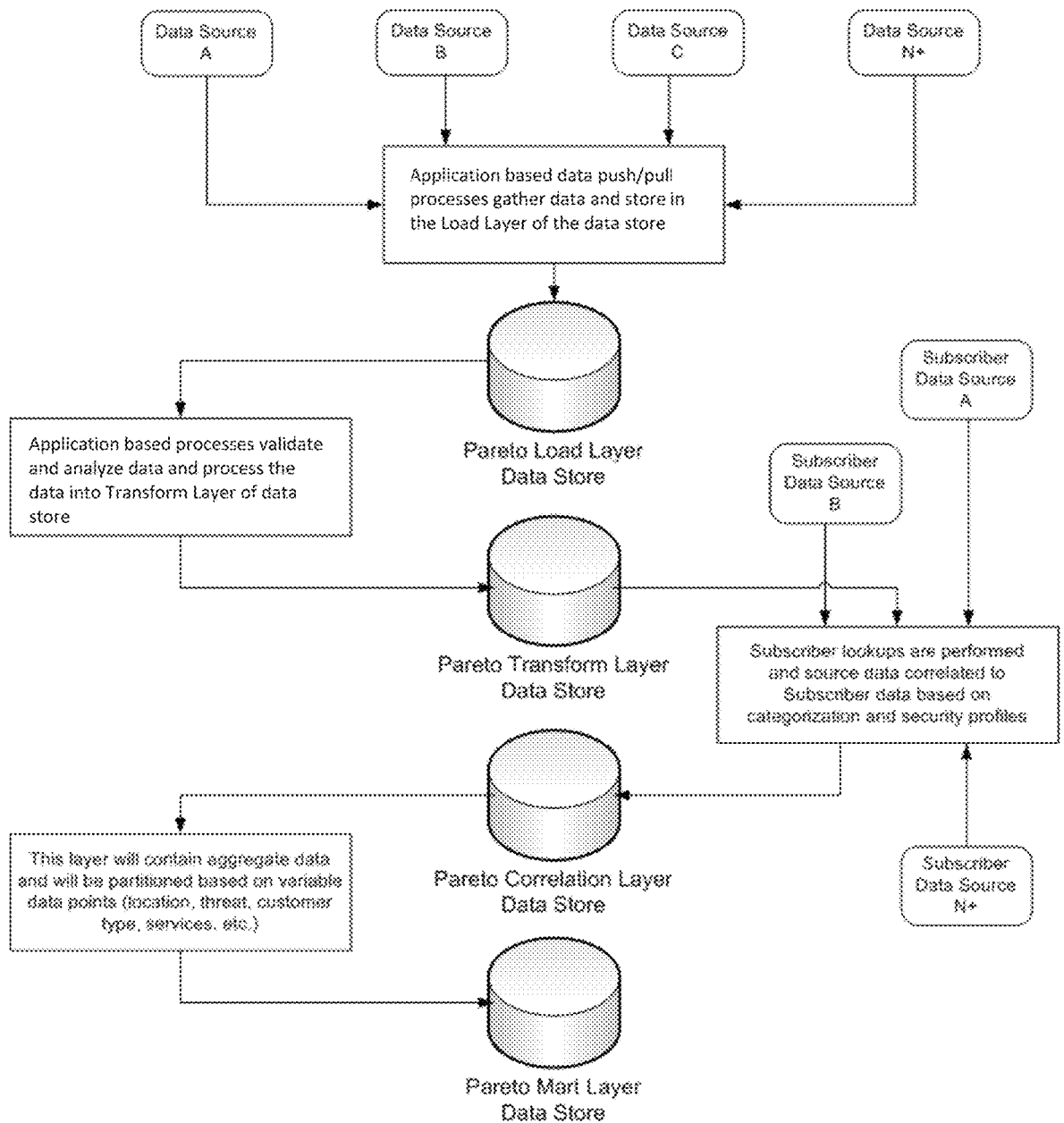
FIG. 6*b* is a logical block diagram illustrating one implementation of the methodology of FIG. 6*a*.

FIGS. 6a and 6b illustrates one implementation 640 of the generalized method of FIG. 6, in the context of the data architecture 520 of FIG. 5a.

FIG. 7 is a logical block diagram illustrating one embodiment of a method 700 of data enrichment according to the disclosure. Specifically, as shown in FIG. 7, threats ingested into the MSO's system 200 (acquired by e.g., push/pull methods depending on the source system's data availability, such as SFTP, HTTPS Get methods, or hosted Web API/REST web services) are processed to correlate the ingested data (e.g., infection report at step 702) to one or more subscribers and/or accounts. For each threat ingested into the system, a subscriber lookup is performed based on the IP (address) and Timestamp associated with the threat record, and this can be correlated to e.g., a cable modem (CM) per step 704. Such correlation may be provided for instance based on an installation record of the CM, MAC address of the device, etc. The CM can then be correlated to the given customer/account (step 708). Results may also be validated via e.g., Simple IP Lookup Verification logic (SILVer Logic), so as to confirm the accuracy of the subscriber results. The identified "bot" from the report (if any) can be correlated to a given type of infection or attack per step 706; from this, a list of potential corrective and/or preventive actions is generated, and a list of potentially affected devices (e.g., subscriber PCs, laptops, mobile devices, etc., which can be identified by e.g., type/model, and/or correlated to specific devices by e.g., MAC address or other mechanism) produced as well (step 710). Once the subscriber or account has been identified, the various information sources associated therewith (e.g., call history and subject matter of such calls, billing history, usage of data or services, complaints, prior infections or security violations, and other related information) can be aggregated and ingested into the system 200 as previously described per step 712. The subscriber or account history can also then be updated to reflect the correlation to the new infection report.

Based on that subscriber's history, an algorithm is applied so as to assess or "rate them". For instance, in one embodiment, the algorithm utilizes data on the number and severity of the threats associated with that subscriber so as to generate an overall rating (or series of sub-ratings for different attributes, such as (i) propensity for infection (e.g., based on types of machines, number of different users, past history of visiting "risky" sites or URLs), (ii) profitability (e.g., are they a basic subscriber or high-tier subscriber generating significant income or profit for the MSO), (iii) regularity of use (e.g., are they a frequent user, or more episodic, and which can be indicative of propensity for infection or the spread of an infection), (iv) consumption habits, and so forth), which can be applied to that subscriber subsequently. Based on the subscriber's rating, information will be made available to e.g., MSO or third party services (e.g., EROC/Abuse agents) to understand the details and take appropriate action.

Management of Network Users

As previously indicated, one of the primary attributes of the computerized system of the present disclosure relates to its ability to timely act pre-emptively or proactively with respect to online activities of "problem" subscribers within a network. Another attribute is the ability for the system to help automatically "shape" the subscriber pool; i.e., help identify subscribers whose activity cause significant remediation or other corrective action so as to reduce any ROI by the service provider for servicing that customer. Numerous possible use cases exist for implementing such attributes, examples of which are now described:

1. Customer Service Representative (CSR) Information—In a first use case, the foregoing data generated by the data collection and management entities 202, 208 (see FIG. 2) relating to correlated user activity online can be utilized by CSRs within the service provider's CSR Department to more efficiently and effectively deal with users calling or "chatting" with the CSR. Specifically, in one embodiment, the application programs of the management entity 202 are configured so as to enable distributed access (e.g., having client portions operative to run on terminals or other environments used by the CSRs), such that each CSR can access appropriate portions of the data architecture 520 while engaged with a user. In this fashion, the CSRs are presented with, inter alia, (i) real-time data on user activity; (ii) any relevant correlations or metrics relating to that user (e.g., their activity has been correlated to infection with an "ad bot"), and (iii) preventive and/or corrective actions to be implemented in light of the identified correlation(s). For instance, such users, having been identified as (likely) having an ad bot infection, would be routed to particular technical support links (e.g., via the MSOs Internet website) to implement an automated remediation, tutorial on how such infections occur, and/or remote testing of the user's device.

2. Interactive Voice Response (IVR) Information—In a second use case, the foregoing data generated by the data collection and management entities 202, 208 (see FIG. 2) relating to correlated user activity online can be utilized by IVR systems within the service provider's CS Department to more efficiently and effectively deal with users calling the MSO's CS department and utilizing an IVR system. Such IVR systems often precede talk or chat with a "live" person (e.g., CSR), so as to funnel callers to appropriate service representatives or menus, and filter out calls which can be solved without human interaction (e.g., what is the MSO website URL, selection of PPV or other content, etc.). Hence, in one implementation of the computerized system of the present disclosure, the calling user (e.g., MSO subscriber) is asked a series of questions relating to the reason they are calling, and based on speech-recognized responses provided by the user (or telephonic key inputs), an adaptive decision or response "tree" is applied. For instance, if a user calls the technical support department and states that they are having "computer problems", the IVR system can ask questions of the user (via speech synthesis or other similar technology) to progress through a logic tree relating to the particular identified issue (e.g., ad bot infection, as identified by the correlation within the data architecture 520 with the subscriber's inputs to known ad bot infection symptoms (as well as any metrics or other online activity data for that same user or account which the MSO may have stored, such as regular, episodic high bandwidth consumption or simultaneous communication with numerous other network addresses).

The foregoing tree logic can be adaptive as well; i.e., adapted to that specific user's fact pattern or behavior, in that all ad bot infections (or subscribers causing the infection/possessing the infected computer) may not be treated the same. For example, if the current call is for a fourth bot infection within the last month for that same user, the logic of the tree will be dynamically adapted to present the user with alternatives or actions not presented to others on say, their first bot infection, and may include more austere compensatory mechanisms such as automatically implementing a "blacklist" of certain websites or URLs for that user, restricting their services, etc.

3. Automated or Substantially Automated Modification of Services—In a third use case, the foregoing data generated by the data collection and management entities 202, 208 (see FIG. 2) relating to correlated user activity online can be utilized by the network operator to modify the services provided to the user, whether globally (i.e., at all times going forward), or on a situational or event-driven basis (e.g., in response to detection of certain activities or conditions where deleterious behavior may occur or is likely). Specifically, in one embodiment, the application programs of the management entity 202 are configured so as to generate service modification "recommendations" for consumption by either human entities within the MSO network (e.g., system operators, CSRs, etc.) or automated processing entities (e.g., SRM or session resource managers, business rules engines, supervisory processes, etc.), such that one or more services provided to the user are modified "on the fly". For instance, certain URLs or network addresses may be "blacklisted" and obscured from the user, certain types of network privileges or features suspended, downstream or upstream data bandwidth throttled, restriction of access to only certain types of data structures (e.g., no download of .zip or executable files), and so forth.

In this fashion, the network operator can, inter alia, (i) automatically and in real time invoke mitigating or preventive measures to curb deleterious user activity; (ii) provide some degree of "negative feedback" to a user (i.e., that their activity has consequences); of (iii) provide "positive feedback" to the user (i.e., good job on staying infection-free or avoiding potentially compromising activities). These actions may also be implemented incrementally (e.g., data throttling occurring at a progressively higher rate over time or as the deleterious behavior is not curbed), and manually verified (e.g., by a CSR familiar with the user) before implementation.

In extreme cases, the user's service can be completely terminated (e.g., after repeat offenses, or when highly threatening infections are detected), and the user pruned from the service provider's network.

4. Targeted Advertisement Generation—In a fourth use case, the foregoing data generated by the data collection and management entities 202, 208 (see FIG. 2) relating to correlated user activity online can be utilized by the network operator and/or third-party entities (such as advertisers) to select and present contextually related advertisements or promotions that will advise, educate, and/or make aware offending users of possible remediation approaches, etc. Specifically, in one embodiment, the application programs of the management entity 202 are configured so as to enable data relating to the characterization/correlation of the user's activity generated by the activity manager and stored within the data architecture 502 to be forwarded to a networked "ad decision" server or other process, for selection of the contextually related content. As used herein, the term "contextually related" may include without limitation content which is related by virtue of temporal context (e.g., is applicable for a given period of time), content which by virtue of its subject matter relates to a topic of interest (e.g., anti-virus software ads selected for presentation to a user with a bot or other malware infection), which are geographically relevant (e.g., for users in a prescribed region, zip code, etc.), or which are demographically or psychographically related to the user in some way.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

It will be appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of proactively mitigating online illicit activity, the computerized method performed by an online service provider based at least on collected data relating to online activity, the computerized method comprising:
   collecting data indicative of online activity by a plurality of subscribers;
   algorithmically evaluating at least portions of the collected data, the algorithmically evaluating of the at least portions of the collected data comprising algorithmically evaluating data relating to two or more of the plurality of subscribers collectively; and
   based at least in part on the evaluating of the collected data, modifying services provided to one or more individual ones of the plurality of subscribers, the modifying of the services comprising (i) invoking at least one preventive routine, the at least one preventive routine comprising changing a configuration of at least one network parameter so as to at least partly restrict execution of one or more functions of the online activity by the one or more individual ones of the plurality of subscribers, and (ii) modifying one or more services provided to each of the two or more of the plurality of subscribers concurrently.

2. The computerized method of claim 1, wherein the collecting of the data indicative of the online activity comprises collecting data from a plurality of different sources; and
   wherein the computerized method further comprises pre-processing the data collected from the plurality of different sources, the pre-processing comprising:
      filtering at least a portion of the data collected from the plurality of different sources to remove at least some of the data collected and produce a filtered data set; and
      normalizing the filtered data set to a common format to support subsequent automated processing thereof.

3. The computerized method of claim 1, wherein the proactively mitigating of the online illicit activity comprises performing at least portions of the algorithmically evaluating and the modifying of the services substantially in real time in an automated fashion.

4. The computerized method of claim 1, wherein the algorithmically evaluating the at least portions of the collected data comprises algorithmically correlating (i) the at least portions of the collected data to data relating to (ii) one or more signatures comprising data descriptive of one or more activities or patterns of activity, the one or more activities or patterns indicative of undesired behavior.

5. The computerized method of claim 4, wherein the changing the configuration of the at least one network parameter so as to at least partly restrict the execution of the one or more functions of the online activity by the one or more individual ones of the plurality of subscribers comprises changing the at least one network parameter to at least partly prevent at least portions of the undesired behavior from being completed by the one or more individual ones of the plurality of subscribers.

6. A computerized method of proactively mitigating future risk relating to online activity of a plurality of subscribers of a service provider network, the computerized method comprising:
   collecting first data indicative of first online activity by the plurality of subscribers, the collecting of the first data comprising collecting historical data relating at least to prior activity by specific ones of the plurality of subscribers;
   generating one or more profile records for respective ones of the plurality of subscribers based at least on the collected first data, the generated one or more profile records comprising data rating two or more attributes relating to the respective ones of the plurality of subscribers;
   thereafter, collecting second data indicative of second online activity by at least a portion of the plurality of subscribers, the collecting of the second data comprising (i) collecting data indicative of then-current undesired activity by one or more of the plurality of subscribers, and (ii) correlating the data indicative of the then-current undesired activity by the one or more of the plurality of subscribers to one or more of the specific ones of the plurality of subscribers; and
   based at least in part on (i) the data rating the two or more attributes, and (ii) the second data, causing a modification of one or more services provided to one or more individual ones of the at least portion of the plurality of subscribers so as to mitigate risk of future illicit activity by the at least portion of the plurality of subscribers.

7. The computerized method of claim 6, wherein the causing of the modification of the one or more services comprises evaluating at least the collected second data with respect to one or more threat signatures to identify one or more potential attacks previously or currently conducted against the at least portion of the plurality of subscribers.

8. The computerized method of claim 6, wherein:
   the collecting of the first data indicative of the online activity comprises collecting data from a plurality of different sources; and
   the computerized method further comprises pre-processing the data collected from the plurality of different sources, the pre-processing comprising:

filtering at least a portion of the data collected from the plurality of different sources to remove at least some of the data collected and produce a filtered data set; and normalizing the filtered data set to a common format to support subsequent automated processing thereof.

9. The computerized method of claim 6, wherein the correlating the data indicative of the then-current undesired activity by the one or more of the plurality of subscribers to the one or more of the specific ones of the plurality of subscribers comprises correlating at least portions of the collected data indicative of the then-current undesired activity to specific ones of at least one of: (i) account data maintained by the service provider network and specifically related to a particular user, or (ii) account data maintained by the service provider network and specifically related to a particular device of a user.

10. The computerized method of claim 6, wherein the causing of the modification of the one or more services comprises modifying one or more services of a first one of the one or more individual ones of the at least portion of the plurality of subscribers differently than how one or more services of a second one of the one or more individual ones of the at least portion of the plurality of subscribers are modified, the different modification based at least in part on one or more differences in the generated one or more profile records associated with the first one of the one or more individual ones of the at least portion of the plurality of subscribers as compared to the one or more profile records of the second one of the one or more individual ones of the at least portion of the plurality of subscribers.

11. Computer-readable storage apparatus comprising one or more computer programs, the one or more computer programs each comprising a plurality of instructions, wherein the one or more computer programs are configured to, when executed on one or more digital processor apparatus, cause mitigation of future risk relating to online activity of a plurality of users of a service provider network by at least:

collection of first data indicative of first online activity by the plurality of users;

generation of one or more data records relating to the collected first data, the one or more data records each comprising a plurality of different data types;

thereafter, collection of second data indicative of second online activity by at least a portion of the plurality of users;

algorithmic evaluation of the collected second data to identify one or more features or attributes relating to the second online activity;

based at least one the identified one or more features or attributes, selection of at least one level of granularity of the one or more data records to be used in subsequent analysis, the subsequent analysis to determine one or more modifications to one or more services provided to one or more individual ones of the at least portion of the plurality of users;

correlation of at least a portion of the collected second data with data records associated with a particular one of the plurality of users; and performance of the subsequent analysis of the one or more data records at the selected at least one level of granularity to at least in part determine the one or more modifications to the one or more services, the performance of the subsequent analysis comprising determination of one or more modifications to that one or more services that are specific to the particular one of the plurality of users based at least on data of the data records associated with the particular one of the plurality of users.

12. The computer-readable storage apparatus of claim 11, wherein:

the collection of the second data comprises collection of data relating to one or more illicit activity events; and the algorithmic evaluation of the collected second data comprises identification of one or more threat signatures or patterns within the collected second data.

13. The computer-readable storage apparatus of claim 12, wherein the selection of the at least one level of granularity of the one or more data records comprises selection, based at least on the identified one or more threat signatures or patterns, of at least one subset of the plurality of different data types relevant to the identified one or more threat signature or patterns.

14. The computer-readable storage apparatus of claim 11, wherein the one or more digital processor apparatus comprise one or more respective digital processor apparatus of (i) a plurality of activity data collection apparatus, and (ii) an activity manager apparatus, the plurality of activity data collection apparatus comprising at least one network interface configured for data communication with both the service provider network and an Internetwork, for collection of at least portions of the first data, the activity manager apparatus configured to access the generated one or more data records and the second data.

15. The computer-readable storage apparatus of claim 11, wherein the plurality of different data types comprise data (i) obtained from respective ones of a plurality of different data sources, and (ii) relating to different aspects of the online activity.

16. The computer-readable storage apparatus of claim 11, wherein the algorithmic evaluation of the collected second data to identify the one or more features or attributes relating to the second online activity comprises algorithmic identification of a malware infection of at least one of the plurality of users.

17. The computer-readable storage apparatus of claim 11, wherein:

the collection of the first data indicative of the first online activity by the plurality of users comprises a collection of the first data from a plurality of different sources; and the generation of the one or more data records relating to the collected first data comprises processing the first data, the processing comprising:

a filtering of at least a portion of the collected first data to remove at least some of the data collected and produce a filtered data set; and a normalization of the filtered data set to a common format to support subsequent automated processing thereof.

18. The computer-readable storage apparatus of claim 11, wherein at least the algorithmic evaluation of the collected second data to identify the one or more features or attributes relating to the second online activity is conducted substantially in real time in an automated fashion.

19. The computer-readable storage apparatus of claim 11, wherein at least the algorithmic evaluation of the collected second data to identify the one or more features or attributes relating to the second online activity comprises an algorithmic correlation of (i) at least a portion of the collected first data to data relating to (ii) one or more signatures comprising data descriptive of the one or more features or attributes, the one or more features or attributes indicative of undesired behavior.

20. The computer-readable storage apparatus of claim 19, wherein the one or more modifications to the one or more services comprises a change to at least one network parameter to at least partly prevent at least portions of the undesired behavior from being viewed by the particular one of the plurality of users.

\* \* \* \* \*